(12) United States Patent
Goto

(10) Patent No.: US 7,882,511 B2
(45) Date of Patent: Feb. 1, 2011

(54) DISK APPARATUS WITH A RECESS ON A DISK-ACCOMMODATING PORTION

(75) Inventor: Teiyu Goto, Saitama (JP)

(73) Assignee: Sony Computer Entertainment Inc., Tokyo (JP)

( * ) Notice: Subject to any disclaimer, the term of this patent is extended or adjusted under 35 U.S.C. 154(b) by 416 days.

(21) Appl. No.: 11/125,831

(22) Filed: May 10, 2005

(65) Prior Publication Data

US 2005/0273793 A1 Dec. 8, 2005

(30) Foreign Application Priority Data

| May 10, 2004 | (JP) | ............................. 2004-140499 |
| Sep. 17, 2004 | (JP) | ............................. 2004-272493 |

(51) Int. Cl.
G11B 17/04 (2006.01)
G11B 19/20 (2006.01)

(52) U.S. Cl. ........................................ 720/600; 720/707
(58) Field of Classification Search ................ 720/600, 720/651, 604, 705–709, 714
See application file for complete search history.

(56) References Cited

U.S. PATENT DOCUMENTS

| 5,210,737 | A | * | 5/1993 | Liu .............................. 720/600 |
| D367,895 | S | * | 3/1996 | Goto ........................... D21/332 |
| 6,604,635 | B1 | * | 8/2003 | Kutaragi et al. .............. 206/579 |
| 6,785,896 | B2 | * | 8/2004 | Huang ......................... 720/600 |
| 6,862,739 | B1 | * | 3/2005 | Hunter et al. ................ 720/653 |
| 2002/0150028 | A1 | * | 10/2002 | Kurosaka et al. ............ 369/270 |
| 2004/0052167 | A1 | * | 3/2004 | Tsutsumi et al. ........... 369/30.36 |
| 2004/0052168 | A1 | | 3/2004 | Chen et al. |

(Continued)

FOREIGN PATENT DOCUMENTS

CN 1211793 3/1999

(Continued)

OTHER PUBLICATIONS

Sony Press Release "Playstation 2 Gets Stunning New Look; Smaller, Slimmer and Network Ready Playstation 2 to Hit the Market Worldwide in November" http://www.scei.co.jp/corporate/release/pdf/040921a_e.pdf. Sep. 21, 2004.*

(Continued)

*Primary Examiner*—Brian E Miller
*Assistant Examiner*—Adam B Dravininkas
(74) *Attorney, Agent, or Firm*—Katten Muchin Rosenman LLP

(57) ABSTRACT

A disk apparatus is provided that includes an apparatus body including a driving section for rotating a disk, an information reading/writing section, and a control section for controlling the driving section and the information reading/writing section. The disk apparatus also includes a housing accommodating the apparatus body and including a housing body having an accommodating recess formed at a position thereof corresponding to the driving section and the information reading/writing section for accommodating the disk therein, and a lid member supported for pivotal motion on the apparatus body for closing up the accommodating recess. The accommodating recess has a convex portion formed in a projecting manner on a bottom face thereof such that the convex portion surrounds the disk mounted around a rotary shaft of the driving section A space which is formed by the convex portion surrounds the disk having a circular shape and a polygonal shape combined.

3 Claims, 26 Drawing Sheets

U.S. PATENT DOCUMENTS

| | | | |
|---|---|---|---|
| 2004/0062171 | A1 | 4/2004 | Huang |
| 2004/0076102 | A1 | 4/2004 | Huang |

FOREIGN PATENT DOCUMENTS

| | | | |
|---|---|---|---|
| EP | 0 128 629 | | 12/1984 |
| EP | 0 697 693 | | 2/1996 |
| EP | 1 202 269 | | 5/2002 |
| JP | 63-29256 | | 2/1988 |
| JP | 63-138646 | | 9/1988 |
| JP | 6-76448 | | 3/1994 |
| JP | 06076448 | A * | 3/1994 |
| JP | 6-350261 | | 12/1994 |
| JP | 7-6489 | | 1/1995 |
| JP | 11-126409 | | 5/1999 |
| JP | 2000-113660 | | 4/2000 |
| JP | 2000-132894 | | 5/2000 |
| JP | 2000132894 | A * | 5/2000 |
| JP | 2001-68864 | | 3/2001 |
| JP | 2002-358769 | | 12/2002 |
| JP | 2003-67920 | | 3/2003 |
| JP | 2003-109279 | | 4/2003 |
| JP | 2003-109280 | | 4/2003 |
| TW | 568323 | | 12/2003 |
| TW | 577619 | | 2/2004 |

OTHER PUBLICATIONS

"PSTwo—Official—Full Details and every image available right here" http://spong.com/article 7676?cb=889. Sep. 21, 2004.*

"PS2 PlayStation 2 Instruction Manual" Manual for SCPH-70011 and SCPH-70012. Sony Electronics Inc. 2004.*

European Search Report dated Oct. 2, 2007, from the corresponding European Application.

Notification of Reason(s) for Rejection dated Dec. 11, 2007, from the corresponding Japanese Application.

Chinese Office Action dated Sep. 21, 2007, for the corresponding Chinese Patent Application No. 200510070193.9 with partial translation.

Taiwanese Search Report dated Jul. 9, 2009, from the corresponding Taiwanese Application.

Communication Pursuant to Article 94(3) EPC dated Apr. 1, 2010, from the corresponding European Application.

* cited by examiner

FIG.7
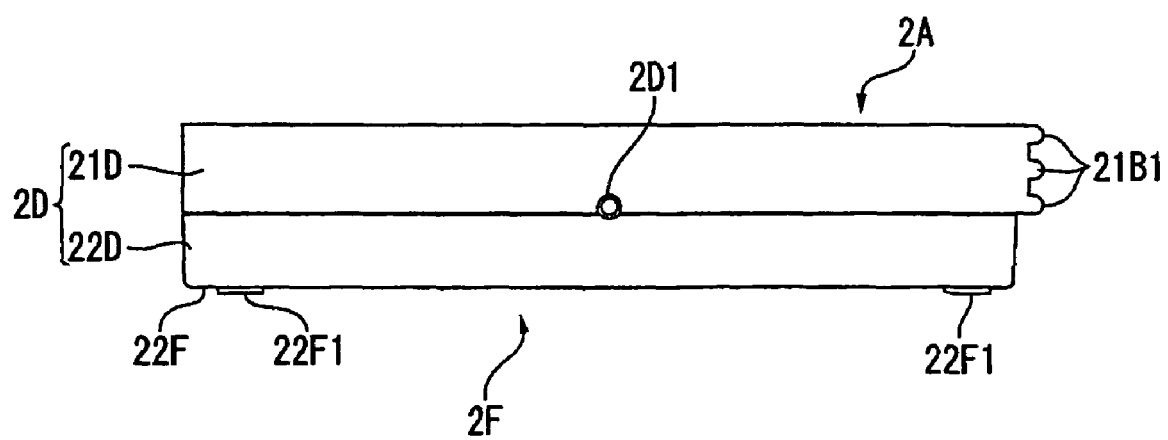
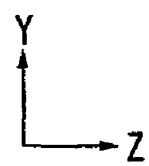

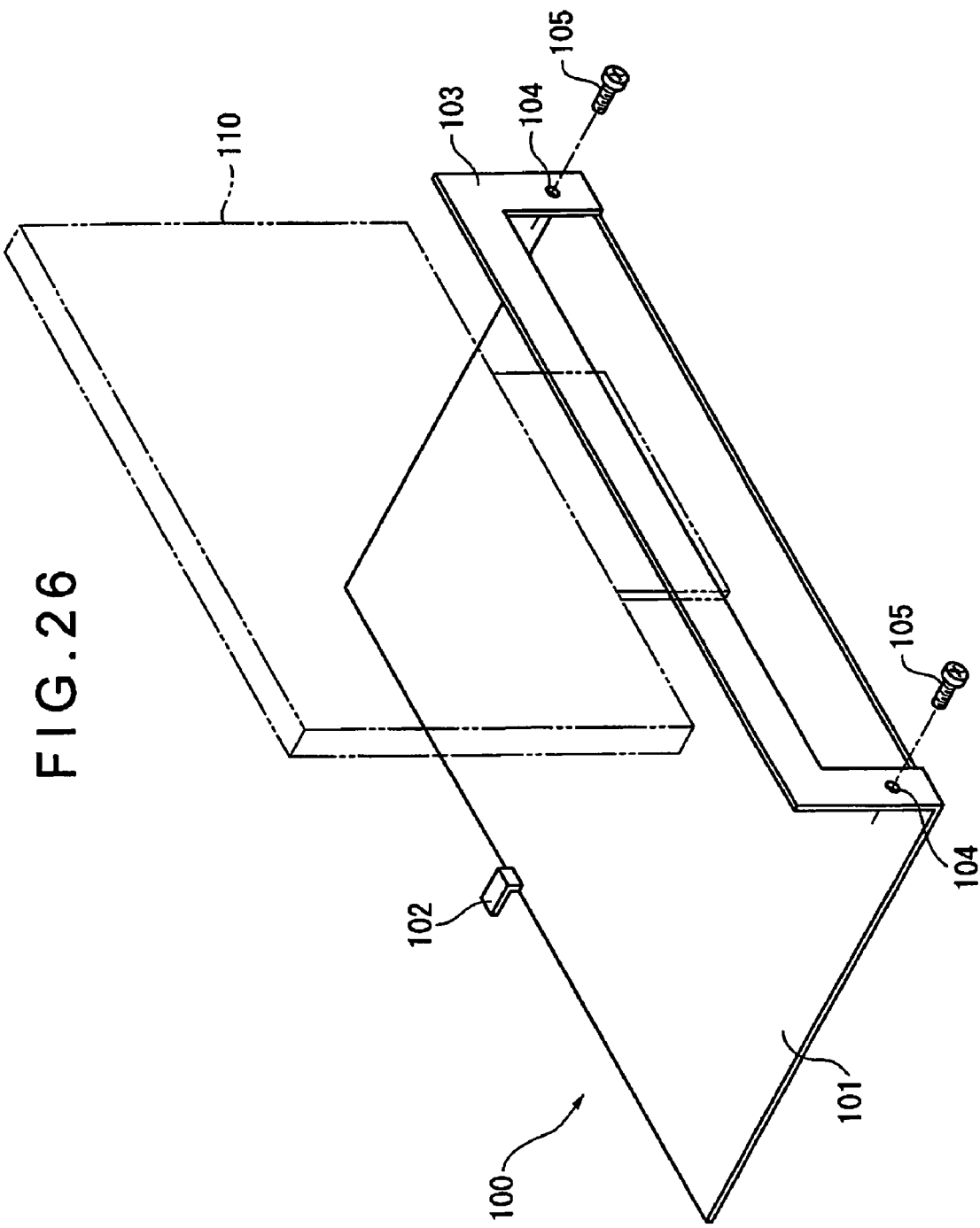

DISK APPARATUS WITH A RECESS ON A DISK-ACCOMMODATING PORTION

BACKGROUND OF THE INVENTION

1. Field of the Invention

This invention relates to a disk apparatus which includes an apparatus body including a driving section for rotating a disk of a substantially circular shape on and/or from which information is to be recorded and/or reproduced, an information reading/writing section for recording information recorded on the rotating disk and/or recording information on the disk, and a control section for controlling the driving section and the information reading/writing section, and a housing for accommodating the apparatus body therein.

2. Description of Related Art

Optical disk apparatus which reproduce information recorded on an optical disk such as a CD or a DVD) and optical disk apparatus which record/reproduction information on and/or from an optical disk are conventionally known. Such optical disk apparatus are configured such that a light spot is illuminated from an optical pickup on an information recording face of an optical disk loaded therein to detect reflected light from the optical disk to record and/or reproduce information.

As one of such optical disk apparatus as described above, an optical disk apparatus is known which includes an accommodation section for accommodating an optical disk and a lid member for closing up a disk accommodating opening of the accommodation section to cover the optical disk accommodated in the accommodation section. The optical disk apparatus just described is disclosed, for example, in Japanese Patent Laid-Open No. Hei 11-126409 (hereinafter referred to as Patent Document 1).

In the optical disk apparatus having the configuration described above, an optical disk is accommodated into the accommodation section by opening the lid member and mounting the optical disk on a spindle motor exposed in the accommodation section, whereafter the lid member is closed. On the other hand, in order to take out the optical disk, the lid member is opened first, and then an end edge of the optical disk is held by fingers inserted into cutaway portions formed at end portions of the accommodation section. Then, the end portion of the optical is lifted up by the fingers. Thereupon, the engagement between the spindle motor and the optical disk is canceled, and consequently, the optical disk can be taken out from the accommodation section.

In the optical disk disclosed in Patent Document 1, the accommodation section is formed in a circular shape in accordance with the shape of the optical disk, and the cutaway portions are formed on the opposite sides of the accommodation section Therefore, in order to take out the disk, one hand is positioned above the disk first, and then the thumb and the remaining fingers of the hand are inserted into the cutaway portions on the opposite sides of the accommodation section to grasp the opposite end sides of the disk in a diametrical direction and take out the disk from the accommodation section. During the operation, the fingers grasping the disk touch with a high degree of possibility with the recording face of the disk. Therefore, a structure which allows the fingers to hold an outer circumferential end face of the disk and take out the disk with certainty is demanded.

It is an object of the present invention to provide a disk apparatus wherein an outer circumferential end face of a disk can be held by the fingers to take out the disk with certainty.

SUMMARY OF THE INVENTION

In order to attain the object described above, according to the present invention, there is provided a disk apparatus, comprising an apparatus body including a driving section for rotating a disk of a substantially circular shape on and/or from which information is to be recorded and/or reproduced, an information reading/writing section for reading information recorded on the rotating disk and/or recording information on the disk, and a control section for controlling the driving section and the information reading/writing section, and a housing for accommodating the apparatus body therein, the housing including a housing body having an accommodating recess formed at a position thereof corresponding to the driving section and the information reading/writing section for accommodating the disk therein and a lid member supported for pivotal motion on the apparatus body for closing up the accommodating recess, the accommodating recess having a convex portion formed in a projecting manner on a bottom face thereof such that the convex portion surrounds the disk mounted around a rotary shaft of the driving section, a space which is formed by the convex portion and surrounds the disk having a shape wherein a circular shape conforming to the shape of an outer profile of the disk and a polygonal shape are combined as viewed in a direction in which the disk is accommodated.

The disk may be any of optical disks such as a CD, a CD-ROM, a CD-R, a CD-RW, a DVD-ROM, a DVD-R, a DVD-RW, a DVD+R, a DVD+RW and a DVD-RAM, a magneto-optical disk (MO disk), a magnetic disk or the like.

The combination of a circular shape conforming to the shape of an outer profile of the disk and a polygonal shape is a combination of a circular shape and a polygonal shape including a triangular shape. In other words, the shape of the space which is formed by the convex portion and surrounds the disk is provided by a combination of part of a profile of a circular shape and part of a profile of a polygonal shape.

In the disk apparatus, since the space which is formed by the convex portion and surrounds the disk has a shape of a combination of a circular shape conforming to the shape of an outer profile of the disk and a polygonal shape, or in other words, since the space has a spatial shape having the corner portions of the polygonal shape on the outer side of the circular shape, the fingers can be inserted into the corner portions and hold the disk to take out the disk. Besides, since the portions into which the fingers are inserted are formed from the corner portions, that is, since the portions are formed in a substantially triangular shape whose widthwise dimension gradually increases toward an outer circumferential edge of the disk from the corner portions, the fingers can be inserted readily into the portions. Then, if the fingers are advanced toward the outer circumferential face of the disk along the bottom face of the corner portions, then the fingers can contact directly with the outer circumferential end face of the disk. Accordingly, the disk can be taken out while the recording face of the disk is not touched by the fingers.

BRIEF DESCRIPTION OF THE DRAWINGS

FIG. 7 is another side elevational view of the entertainment apparatus of FIG. 1;

FIG. 26 is a perspective view showing a display apparatus and an attachment of the entertainment apparatus of FIG. 1.

DETAILED DESCRIPTION OF THE PREFERRED EMBODIMENT

Figure 1:
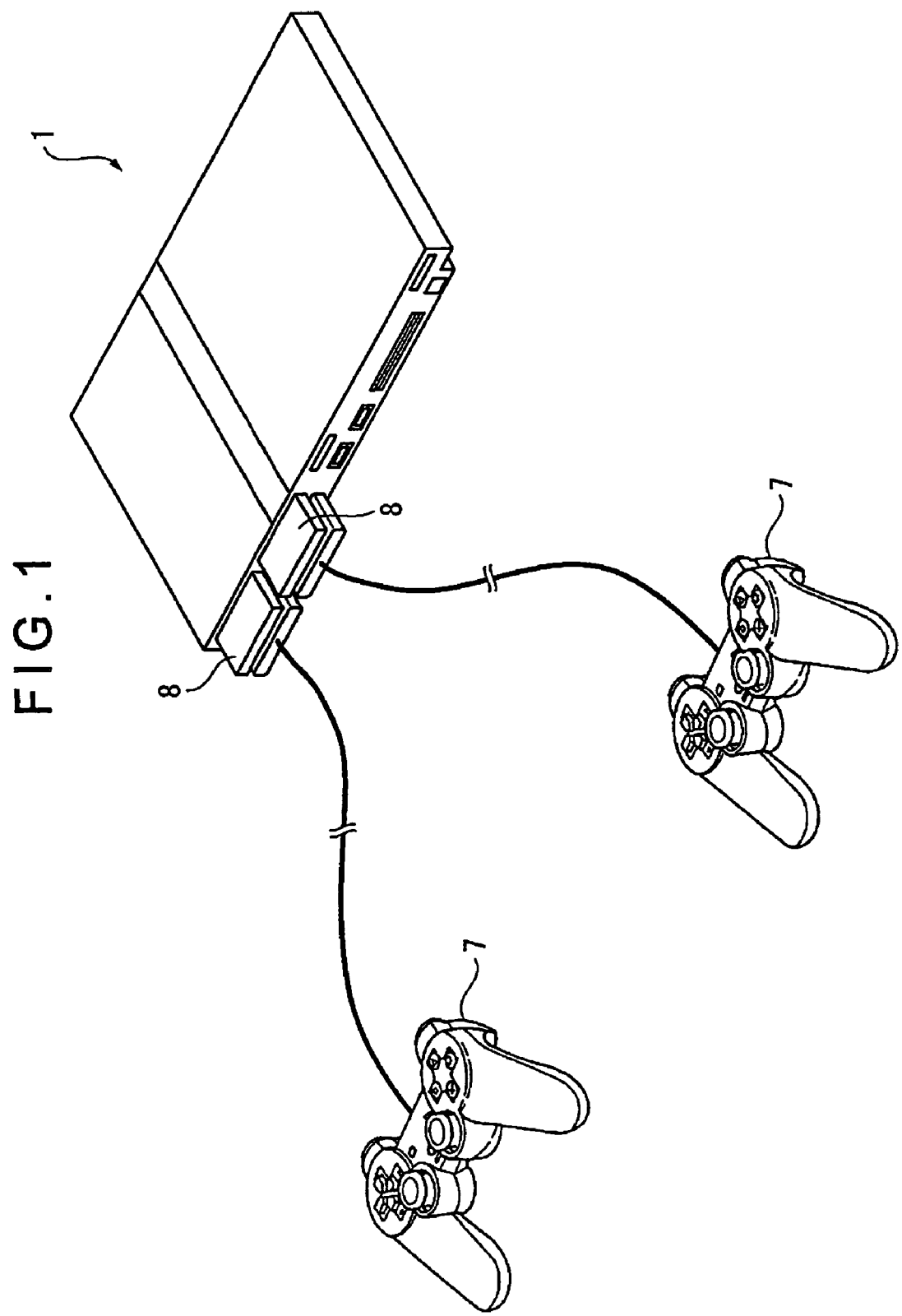
FIG. 1 is a perspective view showing a configuration of an entertainment apparatus to which the present invention is applied.

Referring first to FIG. 1, there is shown a configuration of an entertainment apparatus 1 to which the present invention is applied.

The entertainment apparatus 1 is a disk apparatus which reads out a game program and so forth recorded on an optical disk such as a CD or a DVD and executes the game program in accordance with an instruction from a controller (not shown) operated by a user (game player) or reproduces audio information and image information recorded on the optical disk. Further, the entertainment apparatus 1 can record information on the optical disk depending upon the type of the optical disk used.

Though not shown, the entertainment apparatus 1 is electrically connected to a television receiver. If the user operates a controller 7, then the entertainment apparatus 1 performs a predetermined process such as, for example, a process of a game program in accordance with the operation of the user, and outputs image information and audio information from a result of the process to the television receiver.

It is to be noted that execution of a game signifies controlling principally of the progress of a game and outputting of image and audio information.

The entertainment apparatus 1 is configured such that not only controllers 7 but also memory cards 8 can be attached thereto. Each of the memory cards 8 has a semiconductor memory accommodated therein so that a progress situation of a game can be recorded into the memory card 8 as occasion demands.

1. Appearance Configuration

Figure 2:
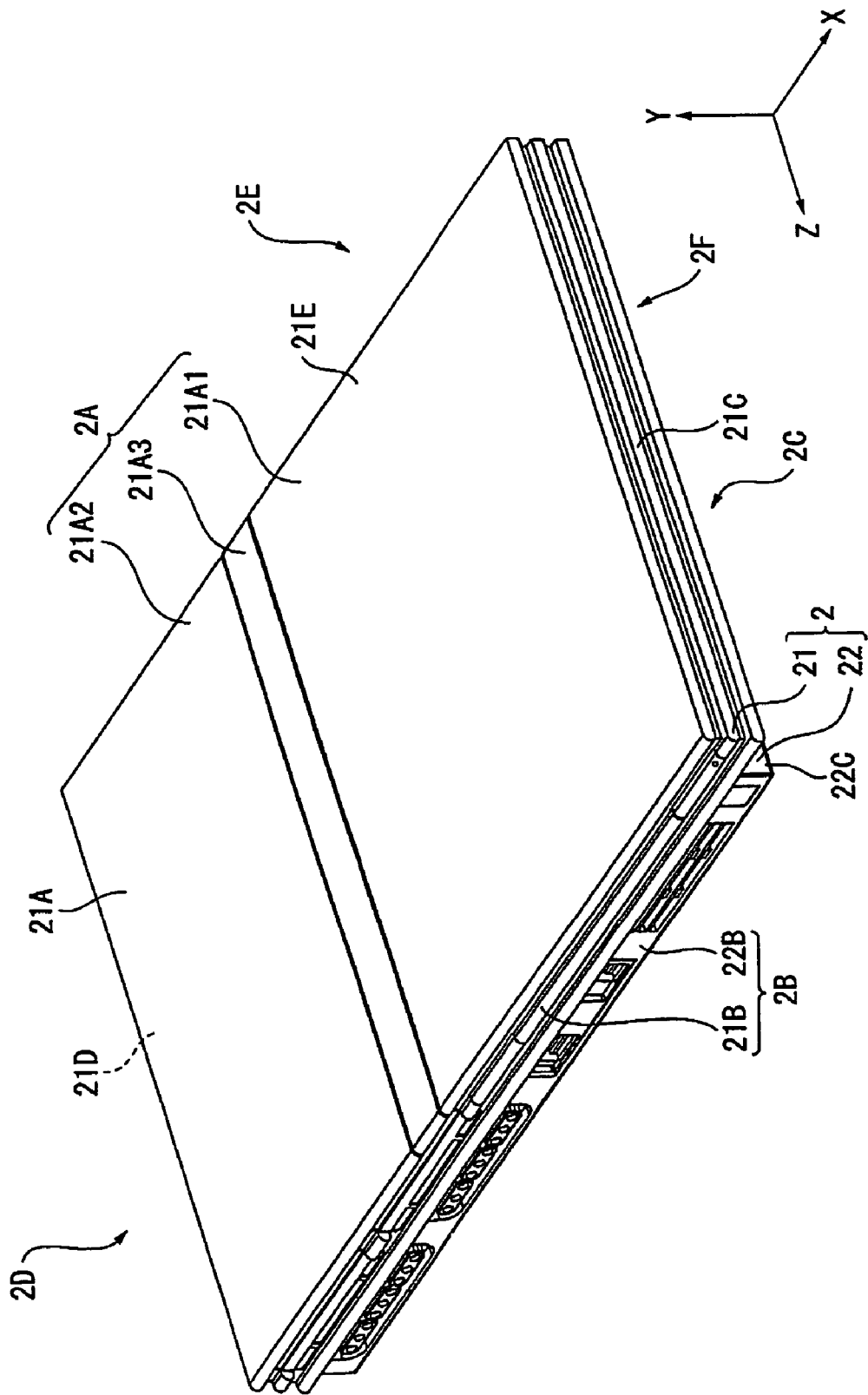
FIG. 2 is a perspective view particularly showing the entertainment apparatus of FIG. 1.
Figure 3:
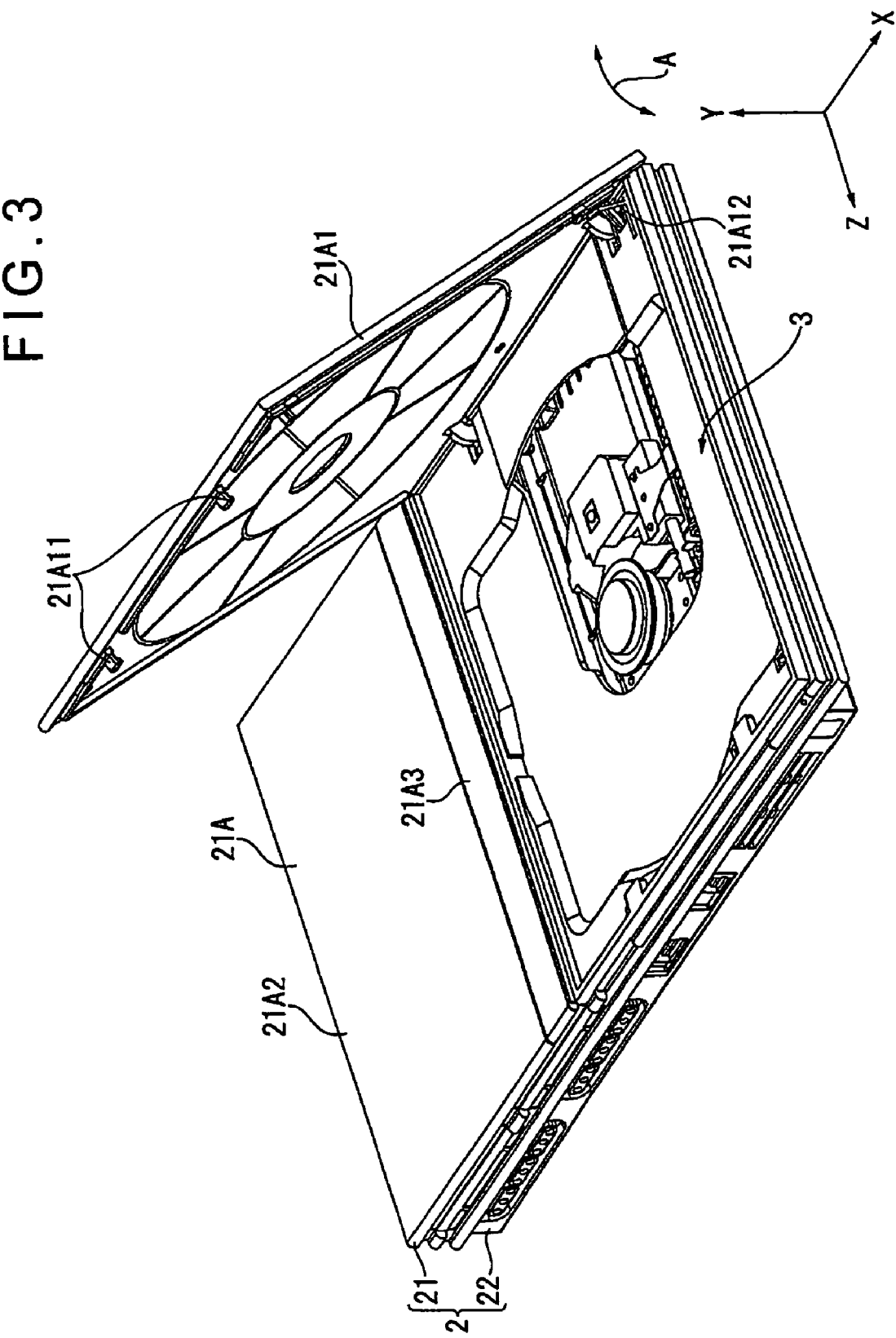
FIG. 3 is a perspective view showing the entertainment apparatus of FIG. 1 with a lid member opened.

FIGS. 2 and 3 show the entertainment apparatus 1 in perspective view. More particularly, FIG. 2 shows the entertainment apparatus 1 in a state wherein a lid member provided on a housing is closed, and FIG. 3 shows the entertainment apparatus 1 in another state wherein the lid member is opened. It is to be noted that X-axis, Y-axis and Z-axis directions shown in FIGS. 2 and 3 are the same directions in FIGS. 2 and 3.

Referring to FIGS. 2 and 3, the entertainment apparatus 1 includes a housing 2 made of a synthetic resin material and having a substantially rectangular shape in plan and a substantially L-shape in front elevation. An apparatus body (not shown) which performs driving control and so forth of the entire entertainment apparatus 1 is accommodated in the housing 2.

The housing 2 has six faces. More particularly, the housing 2 has an upper face portion 2A which is a face directed upwardly (tip end side in the Y-axis direction) when the housing 2 is laid horizontally, and a front face portion 2B which is a face on the front side (tip end side in the Z-axis direction) of the entertainment apparatus 1. The housing 2 further has a side face portion 2C which is a side face on the right side (tip end side in the X-axis direction) with respect to the front face portion 2B, and a side face portion 2D which is a face on the left side (base end side in the X-axis direction) with respect to the front face portion 2B. The housing 2 further has a back face portion 2E which is a face on the opposite side (base end side in the Z-axis direction) to the front face portion 2B, and a bottom face portion 2F which is a face on the opposite side (base end side in the Y-axis direction) to the upper face portion 2A and at which the housing 2 is placed at an installation location.

The housing 2 includes an upper case 21 serving as a housing body which covers an upper portion of the apparatus body when the housing 2 is placed horizontally, and a lower case 22 which covers a lower portion of the apparatus body. The upper case 21 and the lower case 22 are fitted with each other to form the housing 2.

The upper case 21 has an upper face portion 21A which is a face on the tip end side in the Y-axis direction, a front face portion 21B which is a face on the tip end side in the Z-axis direction, and a side face portion 21C which is a face on the tip end side in the X-axis direction and projects from the lower case 22. The upper case 21 further has another side face portion 21D which is a side face on the opposite side to the side face portion 21C, and a back face portion 21E (refer to FIG. 5) which is a side face on the opposite side to the front face portion 21B.

Similarly, the lower case 22 includes a front face portion 22B, a side face portion 22C which is a face on the side on which the upper case 21 projects, another side face portion 22D (refer to FIG. 7) which is a side face opposite to the side face portion 22C, a back face portion 22E (refer to FIG. 5), and a bottom face portion 22F (refer to FIG. 5) which is a face on the base end side in the Y-axis direction.

The upper case 21 projects sidewardly (to the tip end side in the X-axis direction) and the forward direction (to the tip end side in the Z-direction) farther Man the lower case 22.

2. Configuration of the Upper Face Portion

The upper face portion 2A of the housing 2 of the entertainment apparatus 1 is formed from the upper face portion 21A of the upper case 21.

An accommodating recess 3 for accommodating an optical disk therein is formed at a right side portion in FIG. 3 of the upper face portion 21A of the upper case 21. A lid member 21A1 for covering the entire accommodating recess 3 is attached for pivotal motion in the directions indicated by a double-sided arrow mark A at a rear face side end portion of the accommodating recess 3.

A pair of projections 21A11 are provided at an end portion of the lid member 21A1 on the front face portion 21B side. The projections 21A11 project in a hook-like shape perpendicularly from the bottom face of the lid member 21A1, that is, the face of the lid member 21A1 opposing to the accommodating recess 3 as seen in FIG. 3. When the lid member 21A1 is in a closed state, the projections 21A11 engage with locking members not shown provided in the upper case 21 to lock the lid member 21A1. The locking members move along a direction in which the front face portion 21B is formed in response to depression of a lid opening switch hereinafter described, whereupon they are disengaged from the projections 21A11 of the lid member 21A1 thereby to allow the lid member 21A1 to be opened.

A coil spring 21A12 is provided in the proximity of the center of pivotal motion of the lid member 21A1, that is, at a rear face side end portion of the lid member 21A1. The coil spring 21A12 is wound around a pivot shaft of the lid member 21A1 such that the lid member 21A1 is opened making use of the biasing force of the coil spring 21A12.

The structure of the accommodating recess 3 is hereinafter described in detail.

A left side portion of the upper face portion 21A of the upper case 21 is formed as a flat portion 21A2 formed from the upper case 21. A partition member 21A3 made of a synthetic resin material for partitioning the flat portion 21A2 and the lid member 21A1 from each other is provided between the flat portion 21A2 and the lid member 21A1. The partition member 21A3 is formed from a member different from the upper case 21 and fitted with and attached to a fitting portion not shown formed on the upper case 21. Further, the upper faces of the lid member 21A1, flat portion 21A2 and partition member 21A3 are formed so as to be positioned on the same plane. Where such a partition member 21A3 as just described is provided to partition the flat portion 21A2 and the lid member 21A1 from each other, an error in position between the upper face of the flat portion 21A2 and the upper face of the lid member 21A1 which is likely to appear at the stage of production of the housing 2 can be made less conspicuous. Further, even when an external pressure is applied to the housing 2, the partition member 21A3 acts as a reinforcing member and suppresses deformation or the like of the housing 2. Accordingly, the strength of the housing 2 can be enhanced. It is to be noted that the partition member 21A3 may be made of a material different from that of the housing 2.

3. Configuration of the Front Face Portion

Figure 4:
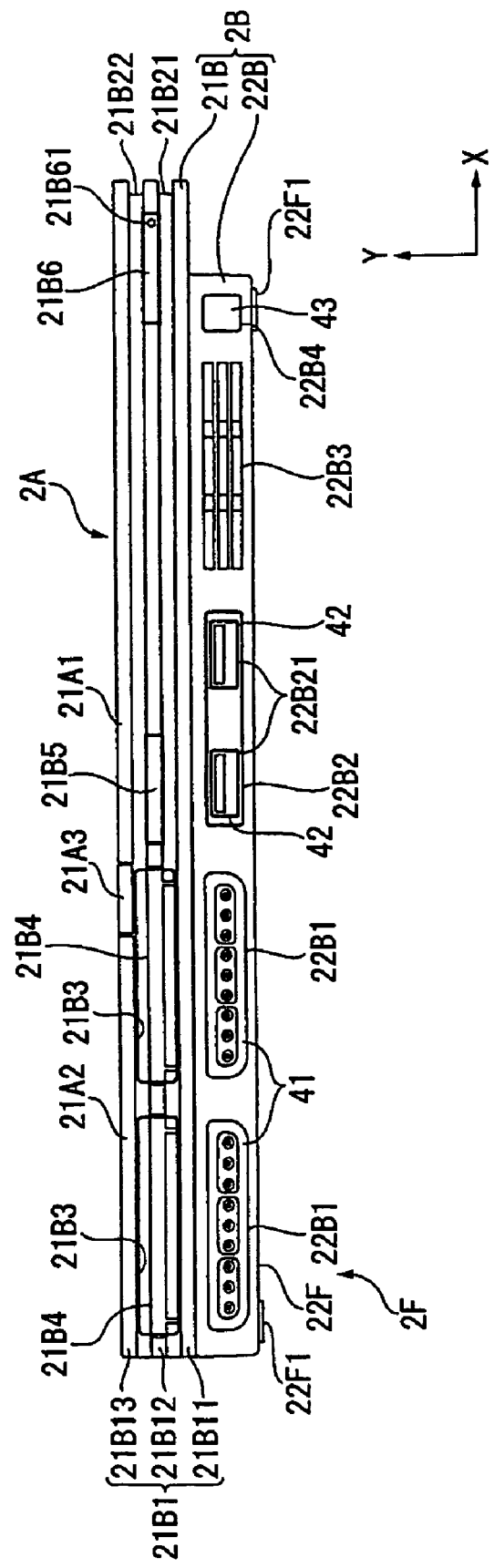
FIG. 4 is a front elevational view of the entertainment apparatus of FIG. 1.

FIG. 4 shows the front face portion 2B of the housing 2 of the entertainment apparatus 1. It is to be noted that the X-axis and Y-axis directions in FIG. 4 are same as the X-axis and Y-axis directions shown in FIGS. 2 and 3, respectively.

The front face portion 2B of the entertainment apparatus 1 is formed from the front face portion 21B of the upper case 21 and the front face portion 22B of the lower case 22.

The front face portion 21B of the upper case 21 has free ribs 21B1 formed thereon such that they extend along a horizontal direction which is the X-axis direction in FIG. 4 and project perpendicularly from the front face portion 21B. The ribs 21B1 are formed at equal distances in the Y-axis direction over an overall area of the front face portion 21B and the side face portion 21C (refer to FIG. 2). More particularly, ribs 21B11, 21B12 and 21B13 are formed in order from the base end side to the tip end side in the Y-axis direction on the front face portion 21B such that a concave portion 21B21 on the base end side and a concave portion 21B22 on the tip end side in the Y-axis direction are defined by the ribs 21B11, 21B12 and 21B13, and the ribs 21B11, 21B12 and 21B13 and the concave portions 21B21 and 21B22 are formed such that they have an equal dimension in the Y-axis direction. It is to be noted that the rib 21B13 on the tip end side in the Y-axis direction extends from the flat portion 21A2, partition member 21A3 and lid member 21A1 described hereinabove. In other words, the positions of the flat portion 21A2, partition member 21A3 and lid member 21A1 on the tip end side in the Z-axis direction are the same as the position to which the other ribs 21B11 and 21B12 extend toward the tip end side in the Z-axis direction.

Two card slots 21B3 which are openings into each of which a memory card 8 is to be inserted, a lid member opening switch 21B5 for opening the lid member 21A1 and a power supply switch 21B6 for switching the power supply to the apparatus body on/off are disposed on the front face portion 21B of the upper case 21.

The two card slots 21B3 are formed in parallel to each other in a substantially rectangular shape elongated in the X-axis direction in a region of the front face portion 21B from the flat portion 21A2 to the partition member 21A3. The card slots 21B3 span from the concave portion 21B21 on the base end side in the Y-axis direction in FIG. 4 to the concave portion 21B22, on the tip end side, across the central rib 21B12. Each of the card slots 21B3 has a lid portion 21B4 provided thereon. The lid portion 21B4 has a pivot shaft along the front face portion 21B and is accommodated into the upper case 21 along the rib 21B11.

The lid member opening switch 21B5 is formed as a push type switch and disposed substantially at the center of the front face portion 21B. Further, the lid member opening switch 21B5 extends along the rib 21B12 provided centrally and is formed in conformity with the size of the rib 21B12 in the Y-axis direction so as to form part of the rib 21B12. If the lid member opening switch 21B5 is depressed, then the locking members (not shown) described hereinabove are moved along the front face portion 21B to cancel the engagement between the projections 21A1 of the lid member 21A1 and the locking members. Consequently, the lid member 21A1 is opened by the biasing force of the coil spring 21A12.

The power supply switch 21B6 is formed as a push type switch similarly to the lid member opening switch 21B5 and extends along the rib 21B12 provided centrally. The power supply switch 21B6 is formed in conformity with the size of the rib 21B12 in the Y-axis direction so as to form part of the rib 21B12. An LED 21B61 is provided on the power supply switch 21B6 and emits light in different colors depending upon whether the power supply is on or off. More particularly, power is supplied through a power supply cable not shown, and whether the power supply is off or on can be discriminated from the color of light emitted from the LED 21B61.

The lid member opening switch 21B5 and the power supply switch 21B6 are disposed such that the faces thereof on the front face side (tip end side in the Z-axis direction) extend along the face of the rib 21B12 on the front side. In other words, the end faces of the switches 21B5 and 21B6 on the tip end side in the Z-axis direction and the end faces of the ribs 21B11, 21B12 and 21B13 on the tip end side in the Z-axis direction are disposed and formed such that the formation positions thereof in the Z-axis direction substantially coincide with each other.

Since the lid member opening switch 21B5 and the power supply switch 21B6 are disposed in an integrated relationship with the rib 21B12 at the formation position of the rib 21B12, the switches 21B5 and 21B6 can be prevented from being operated in error for inputting operation. Consequently, it can be prevented to open the lid member 21A1 or switch off the power supply during operation of the entertainment apparatus 1. Particularly in such a case that the entertainment apparatus 1 is moved, such a situation that a foreign article hits on the lid member opening switch 21B5 to open the lid member 21A1 can be prevented. Accordingly, malfunction of the entertainment apparatus 1 can be prevented.

Further, since the switches 21B5 and 21B6 are disposed in an integrated relationship with the rib 21B12, a sense of unity of the switches 21B5 and 21B6 and the ribs 21B11, 21B12 and 21B13 can be provided to the user. Accordingly, the appearance of the housing 2 can be enhanced.

Two controller connection portions 22B11, a concave portion 22B2, openings 22B3 each in the form of a slit and an opening 22B4 are provided on the front face portion 22B of the lower case 22. The controller connection portions 22B1 are openings to which the controllers 7 (refer to FIG. 1) can be connected. The concave portion 22B2 is formed at the center of the front face portion 22B, and a light receiving element 43 is exposed through the opening 22B4.

The controller connection portions 22B13 are formed corresponding to the locations of the two card slots 21B3 described hereinabove, and a controller connector 41 connected to the apparatus body is exposed to each of the controller connection portions 22B1.

The concave portion 22B2 is formed in a substantially rectangular shape at a substantially central portion of the front face portion 22B, and two external apparatus connecting terminals 42 connected to the apparatus body are individually exposed to the concave portion 22B2. The external apparatus connecting terminals 42 comply with the USB (Universal Serial Bus) standards, and an inputting apparatus such as a keyboard, a pointing device such as a mouse, and an external recording apparatus such as a printer apparatus or a magneto-optical disk drive apparatus can be connected to each of the external apparatus connecting terminals 42.

The openings 22B3 are openings each in the form of a slit for taking in cooling air for cooling components of the apparatus body from the outside therethrough. Though not shown, a dust filter is disposed on the inner side of the openings 22B3.

The opening 22B4 is formed at a portion of the front face portion 22B on the tip end side in the X-axis direction of FIG. 4, and the light receiving element 43 for receiving an infrared signal from a remote controller not shown is exposed in the opening 22B4. The light receiving element 43 is connected to the apparatus body, and the infrared signal received by the light receiving element 43 is converted into an electric signal and outputted to an input/output board of the apparatus body hereinafter described.

4. Configuration of the Back Face Portion

Figure 5:
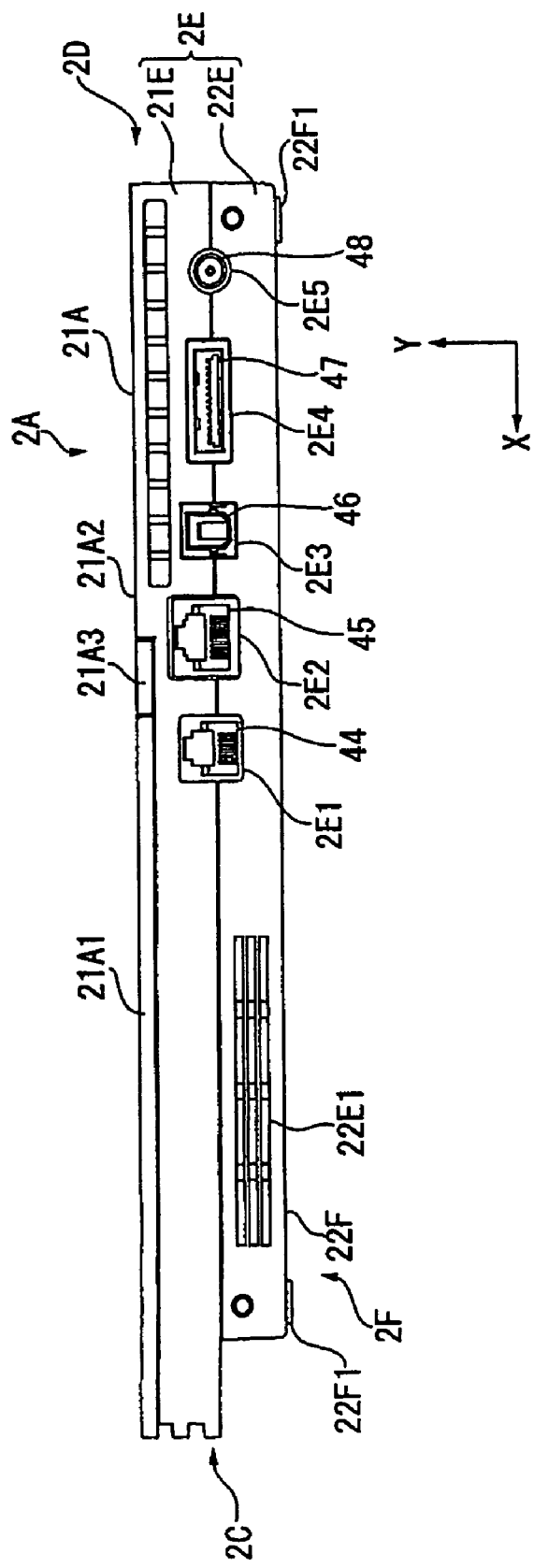
FIG. 5 is a rear elevational view of the entertainment apparatus of FIG. 1.

FIG. 5 shows the back face portion 2E of the entertainment apparatus 1. It is to be noted that the X-axis and Y-axis directions shown in FIG. 5 are same as the X-axis and Y-axis directions shown in FIGS. 2 and 3, respectively.

The back face portion 2E of the entertainment apparatus 1 is formed from the back face portion 21E of the upper case 21 and the back face portion 22E of the lower case 22.

Five openings 2E1, 2E2, 2E3, 2E4 and 2E5 are formed on the back face portion 2E in order from a substantially central portion to an end portion on the side face portion 2D side (opposite side to the X-axis direction) between the rear face portions 21E and 22E of the upper case 21 and the lower case 22. External apparatus connecting terminals 44 to 46, an output terminal 47 and a power supply cable connecting terminal 48 individually connected to the apparatus body are exposed to the openings 2E1 to 2E5, respectively.

More particularly, the external apparatus connecting terminal 44 exposed to the opening 2E1 complies with the ITU-T V.90 and K56 Flex Standards, and a modular jack connected to a telephone line can be connected to the external apparatus connecting terminal 44.

The external apparatus connecting terminal 45 exposed to the opening 2E2 complies with the IEEE 802.3i, and a LAN (Local Area Network) such as the 10 Base-T and 100 Base-TX or the like can be connected to the external apparatus connecting terminal 45.

The external apparatus connecting terminal 46 exposed to the opening 2E3 is a terminal for optical communication complying with the IrDA (Infrared Data Association).

The output terminal 47 exposed to the opening 2E4 is a terminal from which video and audio signals are outputted. To the output terminal 47, a coaxial cable having terminals including a terminal for a video signal and two terminals for an audio signal provided at one end of the coaxial cable is connected at the other end of the coaxial cable.

The power supply cable connecting terminal 48 exposed to the opening 2E5 is provided to supply power from the outside to the apparatus body through an AC adapter not shown.

Openings 22E1 each in the form of a slit are formed at a portion of the back face portion 22E of the lower case 22 on the tip end side in the X-axis direction of FIG. 5. Air taken in through the openings 22E1 is exhausted through the openings 22B3 of the front face portion 22B after it cools the components of the apparatus body. It is to be noted that a dust filter is provided on the inner side of the openings 22E1 similarly as in the openings 22B3 described hereinabove.

5. Configuration of the Side Face Portions

Figure 6:
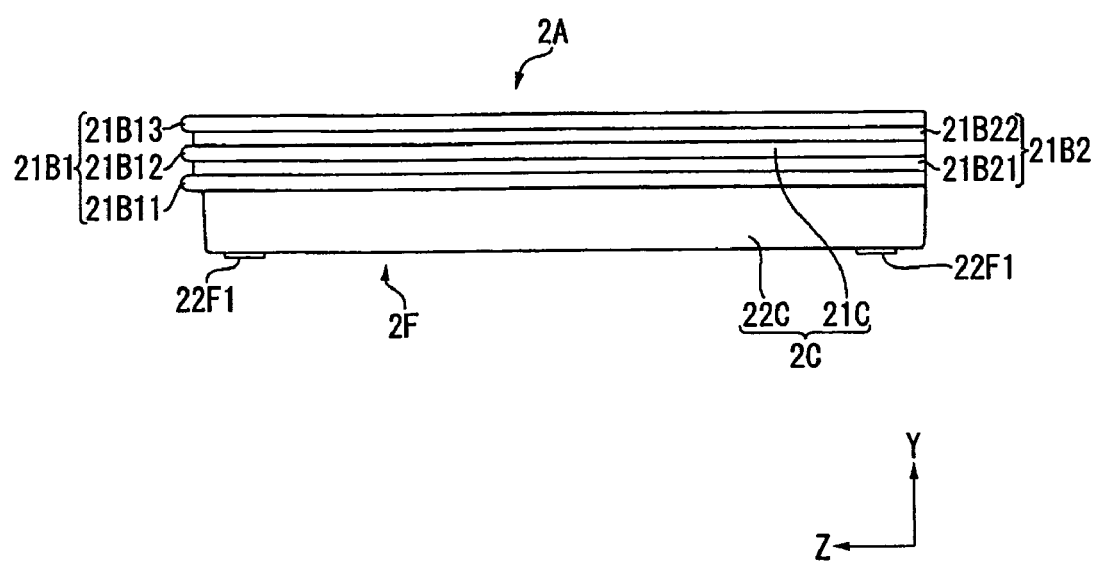
FIG. 6 is a side elevational view of the entertainment apparatus of FIG. 1.

FIG. 6 shows the side face portion 2C which is a side face of the housing 2 of the entertainment apparatus 1 on the tip end side in the X-axis direction. It is to be noted that the Y-axis and Z-axis directions in FIG. 6 are same as the Y-axis and Z-axis directions shown in FIGS. 2 and 3, respectively.

The side face portion 2C is formed from the side face portion 21C of the upper case 21 and the side face portion 22C of the lower case 22.

The ribs 21B11, 21B12 and 21B13 and concave portions 21B21 and 21B22 are formed on the side face portion 21C of the upper case 21 continuously from the front face portion 21B. The side face portion 22C of the lower case 22 is formed flat.

Figure 8:
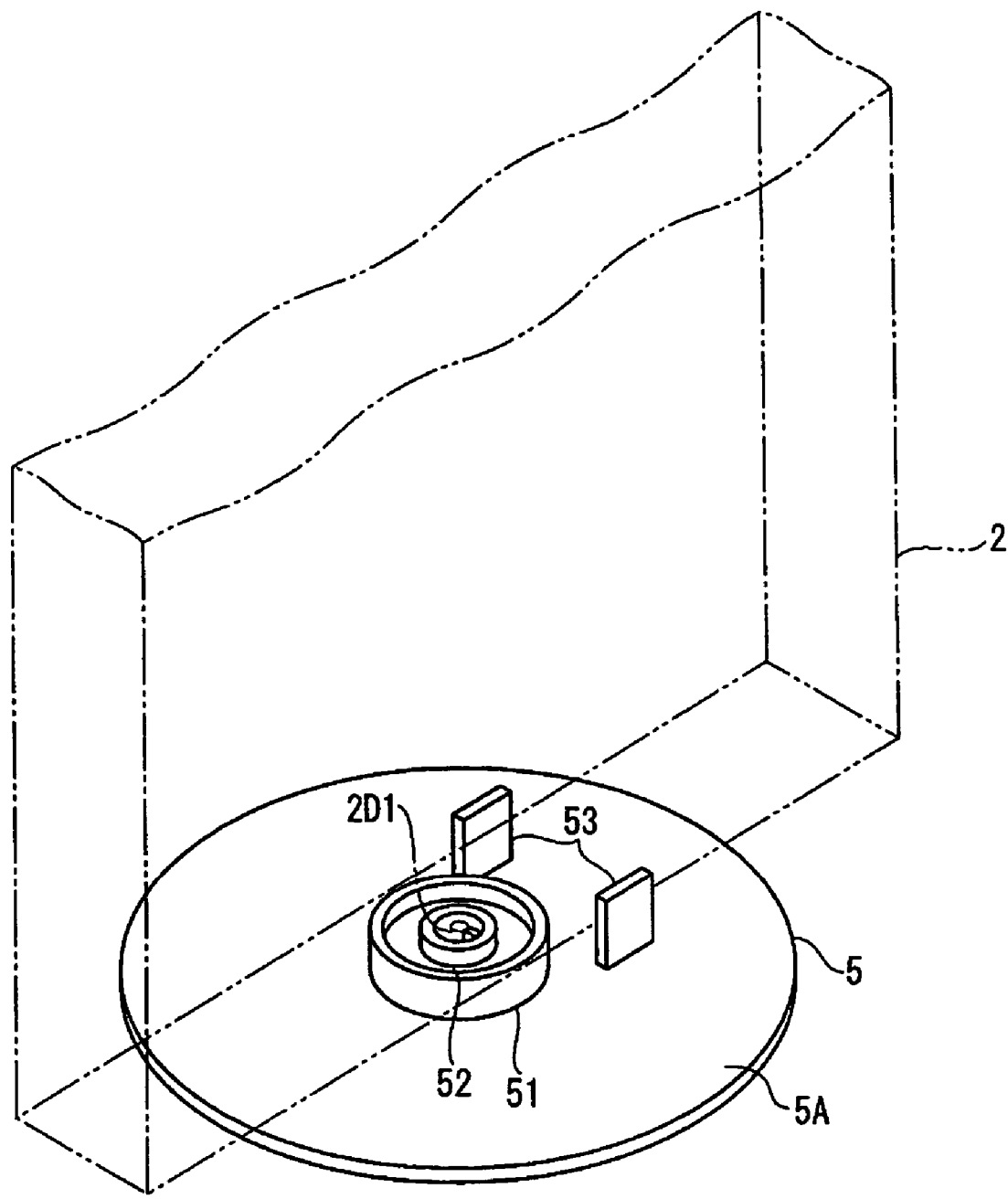
FIG. 8 is a perspective view showing a stand of the entertainment apparatus of FIG. 1.
Figure 9:
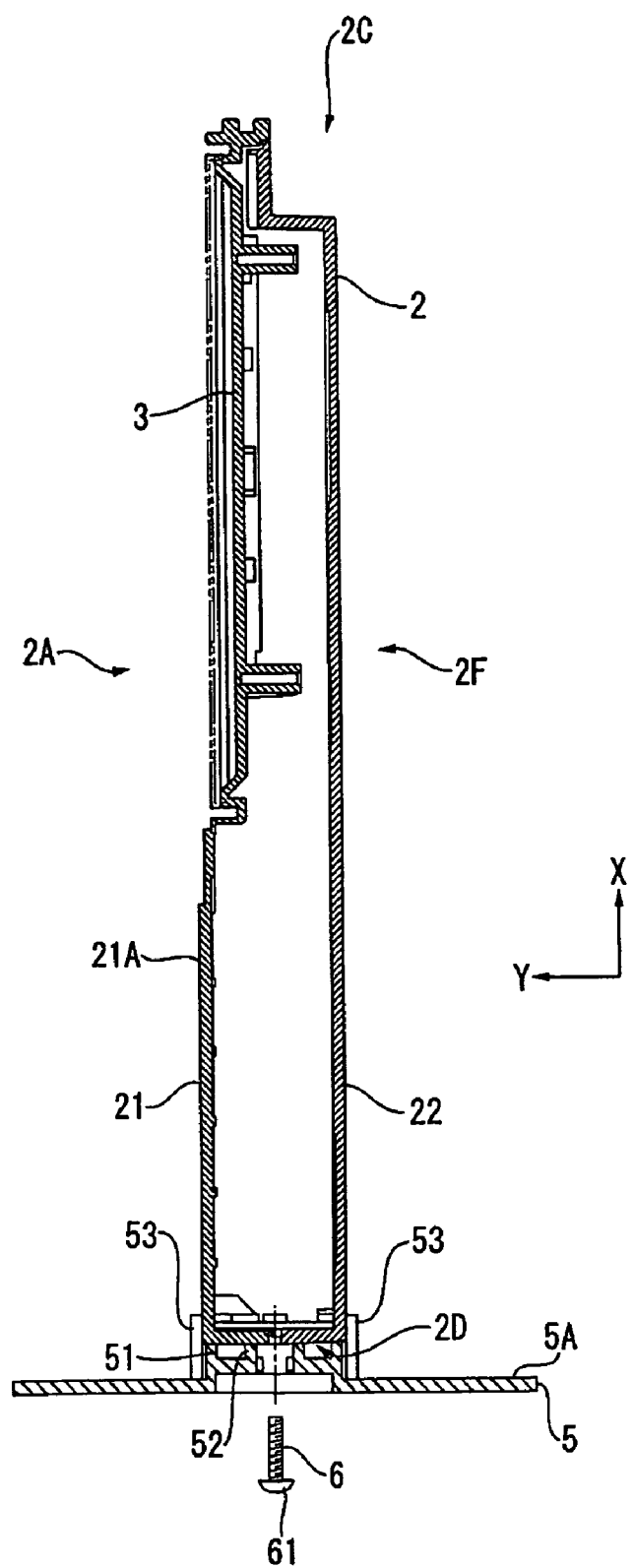
FIG. 9 is a sectional view showing a housing and the stand of the entertainment apparatus of FIG. 1.
Figure 10:
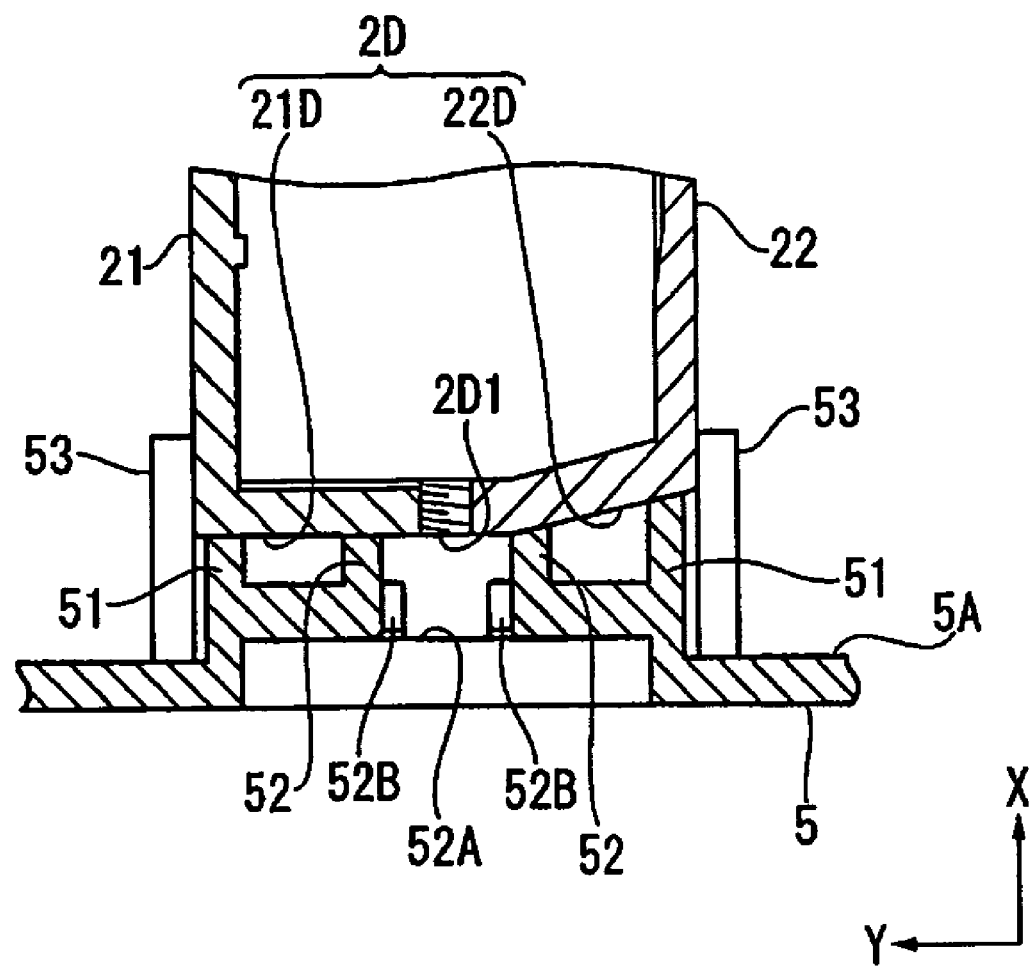
FIG. 10 is a partial enlarged sectional view of the housing and the stand shown in FIG. 9.

FIG. 7 shows the side face portion 2D which is a side face of the housing 2 of the entertainment apparatus 1 on the base end side in the X-axis direction. Further, FIG. 8 shows a stand 5 for supporting the entertainment apparatus 1 when the entertainment apparatus 1 is placed in a vertically erected posture with the side face portion 2D positioned on the bottom. Furthermore, FIG. 9 shows a cross section of the housing 2 to which the stand 5 is attached, and FIG. 10 shows part of FIG. 9 in an enlarged scale. It is to be noted that the X-axis, Y-axis and Z-axis directions in FIGS. 7, 9 and 10 are same as the X-axis, Y-axis and Z-axis directions shown in FIGS. 2 to 6, respectively.

The side face portion 2D is formed from the side face portion 21D of the upper case 21 and the side face portion 22D of the lower case 22. A threaded hole 2D1 serving as a stand attaching portion is formed at a substantially central portion of the side face portion 2D such that it spans between the side face portions 21D and 22D. A screw 6 for securing the stand 5 to be abutted with the side face portion 2D is screwed in the threaded hole 2D1 as seen in FIGS. 8 to 10.

The stand 5 has a substantially circular shape as viewed in plan as seen in FIG. 8, and two cylindrical portions 51 and 52 and a pair of projections 53 are provided on an upper face 5A opposite to the face at which the stand 5 is supported on the ground. The cylindrical portions 51 and 52 are concentric around the center of the upper face 5A and have diameters different from each other. The projections 53 are formed in parallel to a predetermined diametrical direction of the upper face 5A.

The cylindrical portion 51 is formed uprightly in a perpendicular direction from the upper face 5A. The cylindrical portion 52 is formed on the inner side of the cylindrical portion 51 and has a diametrical dimension smaller than that of the cylindrical portion 51. The side face portion 2D of the housing 2 placed in the vertical posture is placed on the upper faces of the cylindrical portions 51 and 52 as seen in FIGS. 9 and 10. Each of the cylindrical portions 51 and 52 is formed in an inclined relationship at one end portion thereof such that the dimension thereof in the heightwise direction (X-axis direction in FIG. 10) decreases toward the center as seen in FIG. 10. This is provided to compensate for possible inclination with which the side face portion 22D may be formed when the lower case 22 is formed by injection molding or the like. Since this inclination is formed in accordance with the inclination of the side face portion 22D of the lower case 22, when the side face portion 2D is placed on the stand 5 and the housing 2 is placed in the vertical posture, the housing 2 extends horizontally and is stabilized.

A hole 52A is formed at the center of the cylindrical portion 52 and extends through the stand 5, and the screw 6 described hereinabove is fitted from below the stand 5 into the hole 52A toward the threaded hole 2D1 of the side face portion 2D. Projections 52B are formed on the inner side of the hole 52A and projects toward the center of the hole 52A. A head 61 (refer to FIG. 9) of the screw 6 fitted from below in the threaded hole 2D1 contacts with the projections 52B through the hole 52A of the stand 5 to prevent the screw 6 from being screwed excessively.

The pair of projections 53 are formed in such a manner as to project perpendicularly from the upper face 5A in parallel to the boundary across which the dimension of the cylindrical portions 51 and 52 in the heightwise direction (X-axis direction) changes and a direction of a diameter interconnecting the cylindrical portions 51 and 52. The upper face portion 2A of the housing 2 contacts with one of faces of the projections 53 opposing to each other, and the bottom face portion 2F of the housing 2 contacts with the other face of the projections 53. The posture of the housing 2 can be maintained by the projections 53. Further, if the direction of the stand 5 on which the projections 53 are formed is defined as the front face portion 2B or the back face portion 2E of the housing 2 placed in the vertical posture, then the direction of the housing 2 on the stand 5 can be recognized by the user.

Where the threaded hole 2D1 for attaching such a stand 5 as described above to the housing 2 is provided and the stand 5 is attached to the housing 2 using the threaded hole 2D1, it is possible to place the entertainment apparatus 1 in the vertical posture. Consequently, one of the horizontally placed posture and the vertically placed posture of the entertainment apparatus 1 can be selectively used in accordance with the location of the entertainment apparatus 1, and the degree of freedom in arrangement of the entertainment apparatus 1 can be enhanced.

Furthermore, since the threaded hole 2D1 is provided on the side face portion 2D of the housing 2, the lid member 21A1 can be positioned on the upper side of the entertainment apparatus 1 in the vertical posture. Consequently, the opening and closing operation can be performed readily, and a loading and unloading operations of an optical disk D can be performed readily.

6. Configuration of the Bottom Face Portion

Figure 11:
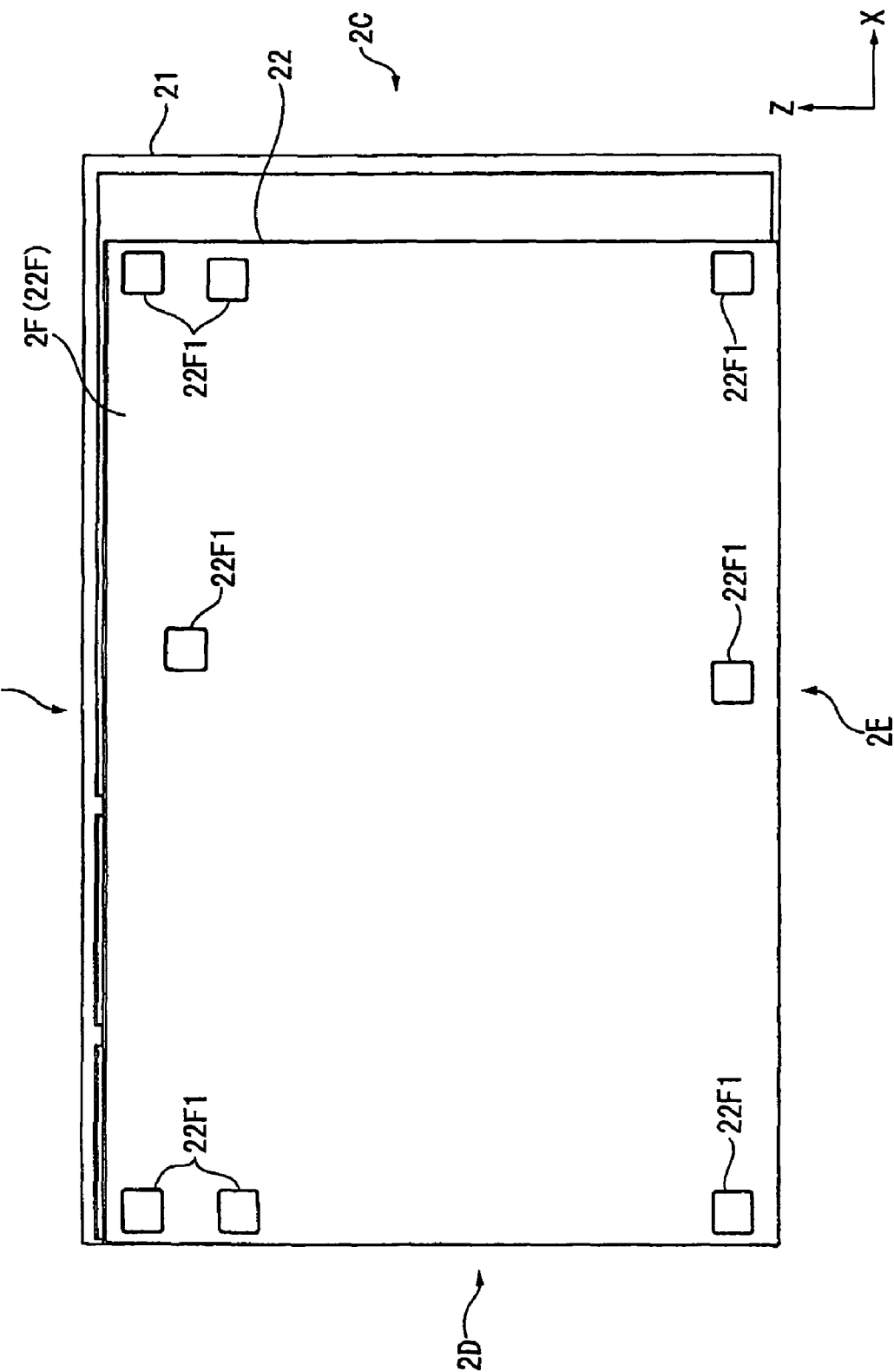
FIG. 11 is a bottom plan view of the entertainment apparatus of FIG. 1.

FIG. 11 shows the bottom face portion 2F which is a side face of the housing 2 of the entertainment apparatus 1 on the base end side in the Y-axis direction. It is to be noted that the X-axis and Z-axis directions in FIG. 11 are same as the X-axis and Z-axis directions shown in FIGS. 2 and 3, respectively.

The bottom face portion 2F of the housing 2 is formed from the bottom face portion 22F of the lower case 22 as shown in FIG. 11. Eight non-slip members 22F1 made of a rubber material are disposed on the bottom face portion 2F. More particularly, the non-slip members 22F1 are provided at the four corner portions of the substantially rectangular bottom face portion 22F, a substantially central portion of the front face portion 2B side (on the tip end side in the Z-axis direction), a substantially central portion on the back face portion 2E side (base end side in the Z-axis direction), a portion on the side face portion 2C side (on the tip end side in the X-axis direction) rather near to the front face portion 2B, and a portion on the side face portion 2D side (base end side in the X-axis direction) rather near to the front face portion 2B. By the non-slip members 22F1, the entertainment apparatus 1 can be placed stably in the vertical posture.

7. Configuration of the Accommodation Section

Figure 12:
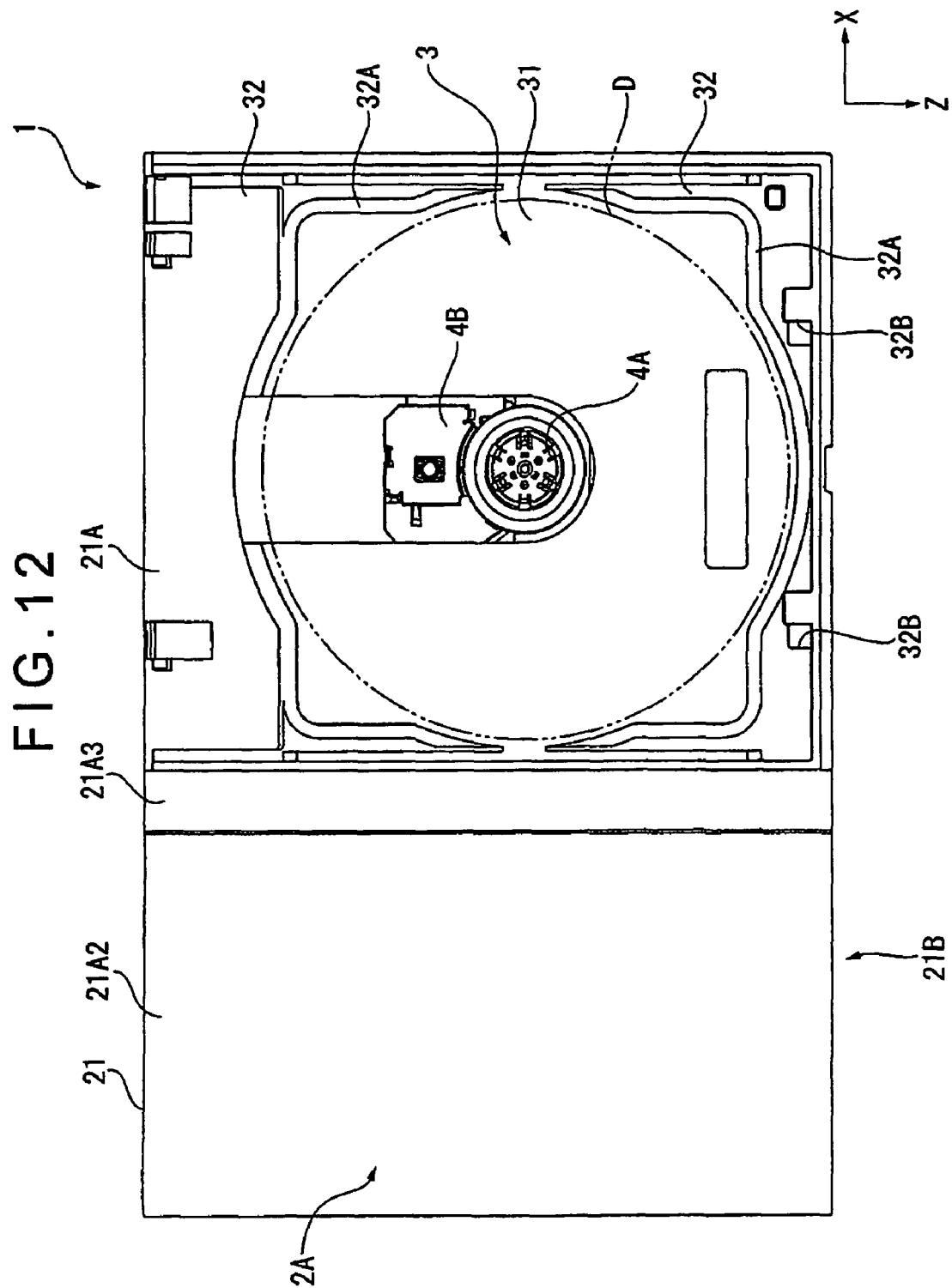
FIG. 12 is a plan view showing an accommodating recess of the entertainment apparatus of FIG. 1.

FIG. 12 shows the accommodating recess 3. In particular, FIG. 12 shows a top plan of the upper face portion 2A with the lid member 21A1 removed.

The accommodating recess 3 is a portion in which the optical disk D is to be accommodated as described hereinabove and is formed in a substantially channel shape in vertical section on the upper face portion 21A of the upper case 21. Referring to FIG. 12, the accommodating recess 3 includes a disk accommodating portion 31 in which the optical disk D in the form of a disk is to be accommodated, and a convex portion 32 provided in a projecting manner on the bottom face of the disk accommodating portion 31 such that it surrounds the optical disk D accommodated in the disk accommodating portion 31. The convex portion 32 is formed integrally with the accommodating recess 3.

A chucking member 4A is provided at the center of the disk accommodating portion 31 and adapted to receive the optical disk D for rotation thereon. The chucking member 4A is supported for rotation on a spindle motor not shown which serves as a driving member. Further, a pickup section 4B is provided and adapted to read a game program, video information and audio information from the optical disk D and record information on the optical disk D when the optical disk D is driven by the spindle motor. The pickup section 4B is mounted for back and forth movement in a radial direction of the optical disk D within a region within which the disk in the disk accommodating portion 31 is accommodated.

The convex portion 32 is formed with a depthwise dimension different from that of the disk accommodating portion 31. In particular, the convex portion 32 is formed shallower than the disk accommodating portion 31. Further, the convex portion 32 has a shape obtained by circularly swelling central portions of the four sides of a rectangle (here, a square) outwardly in accordance with the shape of the optical disk D as viewed in the direction in which the optical disk D is accommodated. More particularly, the lengthwise dimensions of the sides of the rectangle (square) are smaller than the diameter of the optical disk D accommodated in the disk accommodating portion 31, but the length of the diagonal lines is greater than the diameter of the optical disk D. Therefore, the disk accommodating portion 31 has an accommodation space formed from the rectangle (square) and the circle placed one on the other and defined by the convex portion 32.

A face 32A of the convex portion 32 which is opposed to an end face of the optical disk D is formed in an inclined relationship such that it is displaced away from the center of the disk accommodating portion 31 toward the direction away from the plane of the bottom face of the disk accommodating portion 31. Consequently, when the optical disk D is to be accommodated into the disk accommodating portion 31, the face 32A guides the optical disk D toward the center of the disk accommodating portion 31. Therefore, accommodation of the optical disk D into the disk accommodating portion 31 can be performed readily.

Further, two openings 32B are formed at an end portion of the convex portion 32 on the front face portion 21B side. The locking members described hereinabove are provided below the openings 32B, and the projections 21A11 formed on the lid member 21A1 are engaged with the locking members through the openings 32B.

According to the accommodating recess 3 having such a configuration as described above, when the optical disk D is to be taken out from the disk accommodating portion 31, the user can hold the end face of the optical disk D at the four corner portions of the disk accommodating portion 31 with its fingers and take out the optical disk D by picking up the portions of the optical disk D near the end face with the fingers.

Accordingly, the optical disk D can be taken out readily. Further, since the end face of the optical disk D can be held by the fingers at the four corner portions of the disk accommodating portion 31, the region over which the end face of the optical disk D can be held by the fingers can be increased when compared with related-art disk apparatus. Furthermore, since the accommodating recess 3 is configured in such a manner that a shape of the disk accommodating portion 31 is a combination shape of the rectangle and the circle by the convex portion 32, the space of the upper case 21 can be utilized efficiently.

8. Internal Configuration

Though not shown particularly, the apparatus body includes a main board, an input/output control board and a power supply unit for supplying power to the former two boards. The main board, input/output control board and power supply unit are accommodated in the housing 2 described hereinabove.

The main board includes a control system including a CPU (Central Processing Unit) and peripheral apparatus, a graphic system including an image processing apparatus for forming an image and so forth, and a sound system including a sound processing apparatus for outputting music and effect sound and so forth.

The control system includes the CPU, a peripheral apparatus control section for performing interrupt control, control of direct memory access transfer and so forth, main memory including a RAM (Random Access Memory), and a ROM (Read Only Memory) in which programs such as an operating system for managing the graphic system, sound system and so forth are stored.

The CPU executes the operating system stored in the ROM to control the entire entertainment apparatus 1 and is formed from, for example, a 128-bit RISC (Reduced Instruction Set Computer)-CPU.

The graphic system includes the image processing apparatus for forming an image in accordance with an image forming instruction from the CPU, and a frame buffer for storing an image formed by the image processing apparatus. The image processing apparatus performs formation of an image such as a polygon in the frame buffer in accordance with an image formation instruction from the CPU. The image processing apparatus can form an image of approximately 75,000,000 polygons in the maximum for one second.

The sound system includes the sound processing apparatus for outputting BGM (Back Ground Music), effect sound and so forth, and the sound buffer into which waveform data and so forth produced by the sound processing apparatus are registered with an instruction from the CPU.

The input/output board includes an optical disk control section for controlling the optical disk D on which an application program is recorded, and a communication control section for controlling inputting/outputting and so forth of a signal from the controller 7 to which an instruction from the user is inputted, a signal outputted from the controller 7 and data recorded in a memory card 8 mounted in the card clots 21B3.

The optical disk control section includes a decoder for decoding programs, data and so forth recorded, for example, with error correction codes added thereto, and a buffer for temporarily storing data from the optical disk D to achieve high speed reading out of data from the optical disk D.

The communication control section includes the controller connectors 41 (refer to FIG. 4), in which the controller connection portions 22B1 are exposed, and the card slots 21B3 (refer to FIG. 4) provided therein and is electrically connected to card connection terminals not shown connected to a memory card 8. Consequently, if the user operates the controller 7, then a signal from the controller 7, a signal to be outputted to the controller 7, and inputting/outputting of data to and from a recording region of the memory card 8 are controlled by the communication control section. The communication control section is electrically connected not only to the controller 7 but also to the external apparatus connecting terminals 42 and 44 to 46, light receiving element 43, output terminal 47 and so forth so that signal inputting/outputting control from and to an external apparatus can be performed.

9. Configuration of the Repeating Unit

Figure 13:
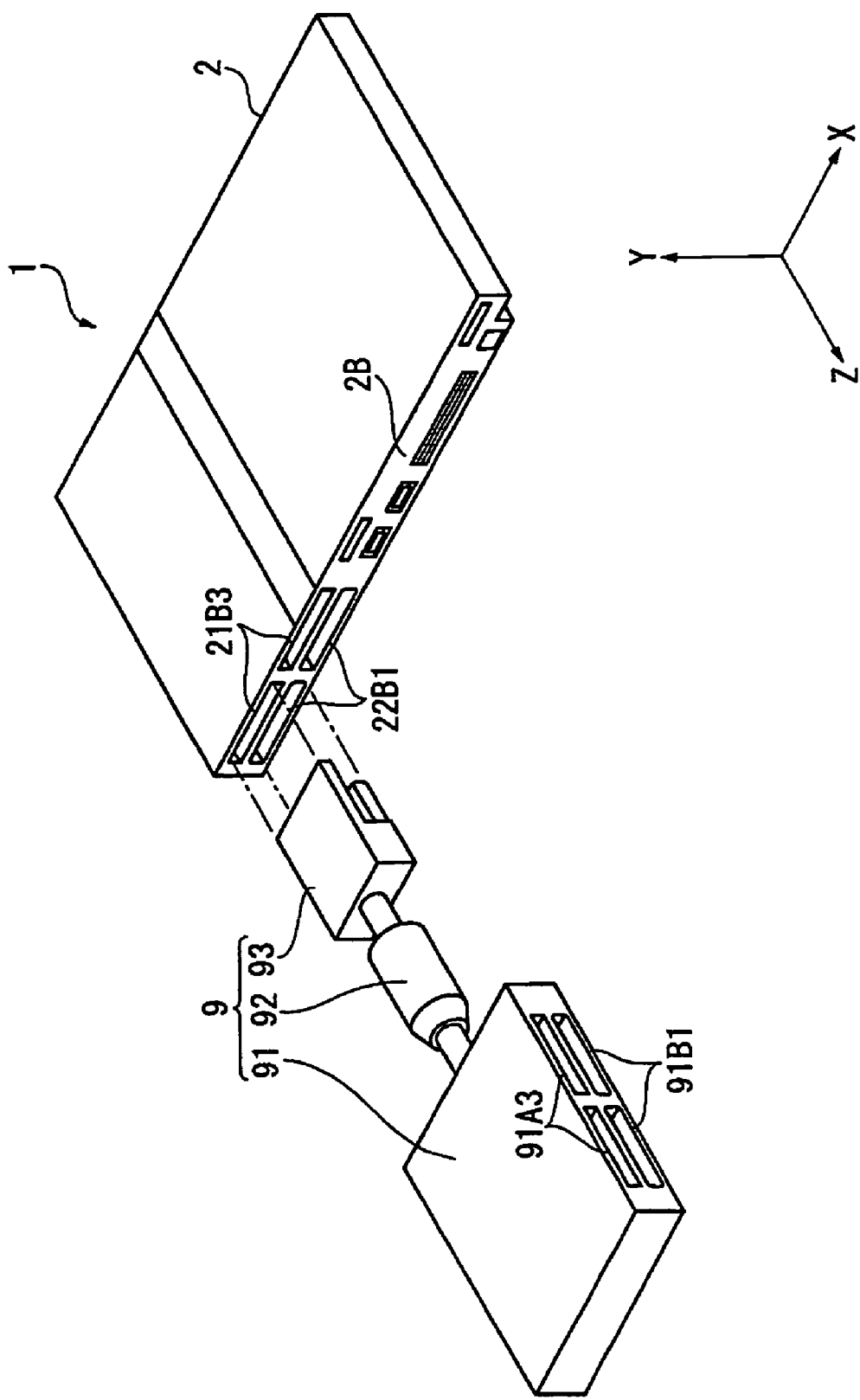
FIG. 13 is a schematic perspective view showing the entertainment apparatus of FIG. 1 and a repeating unit.
Figure 14:
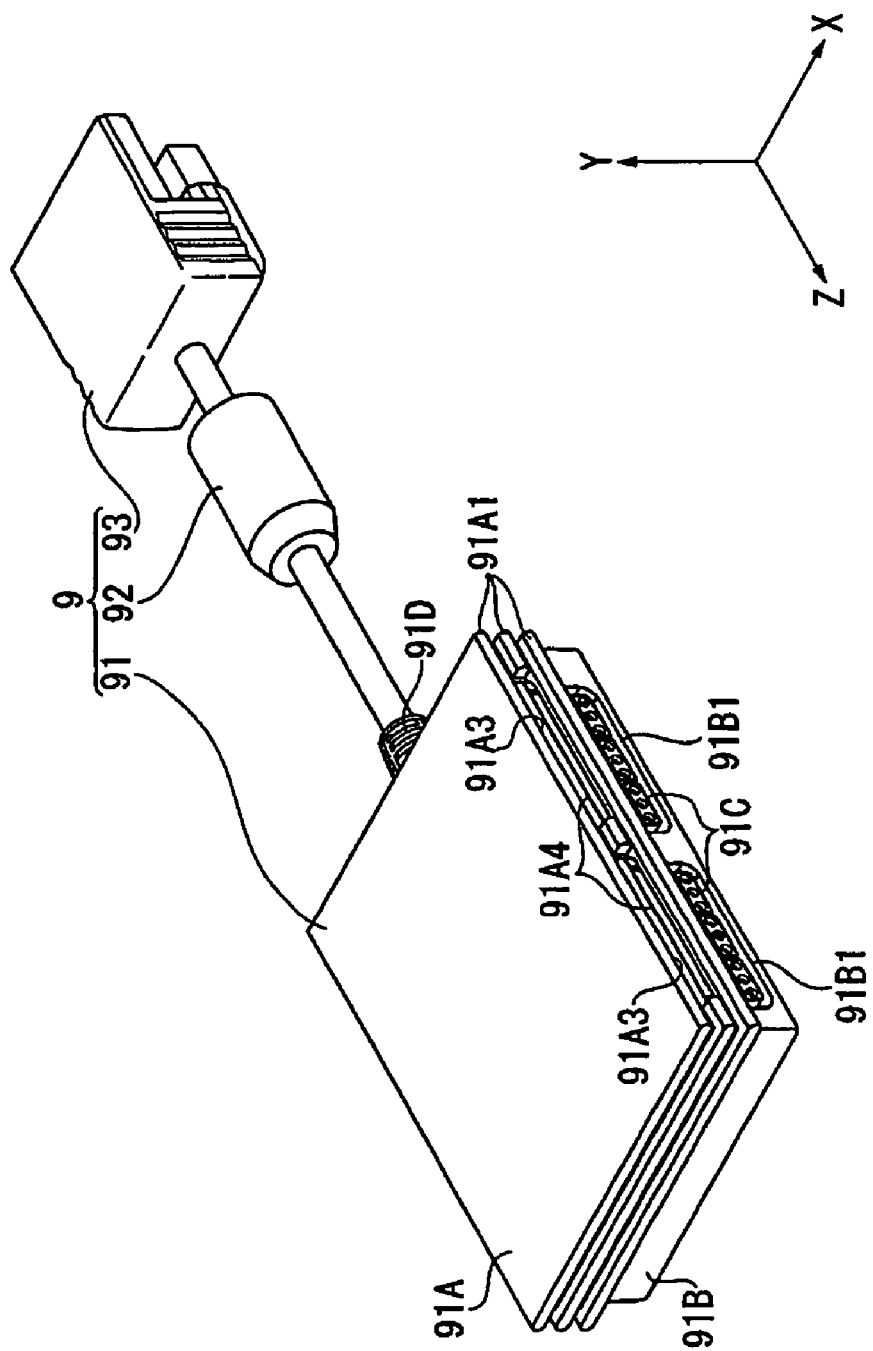
FIG. 14 is a perspective view showing the repeating unit shown in FIG. 13.

FIG. 13 shows a repeating unit 9 to be connected to the entertainment apparatus 1. Further, FIG. 14 shows the repeating unit 9 in a perspective view. It is to be noted that the X-axis, Y-axis and Z-axis directions in FIGS. 13 and 14 are same as the X-axis, Y-axis and Z-axis directions shown in FIGS. 2 and 3, respectively.

Referring to FIG. 13, in the entertainment apparatus 1 described hereinabove, a repeating unit 9 having a plurality of card slots 91A3 and a plurality of controller connecting portions 91B1 can be connected to any the card slots 21B3 formed on the front face portion 2B of the housing 2 and the controller connector 41 exposed in the controller connection portions 22B1 formed in the front face portion 2B. The repeating unit 9 includes a repeating unit body 91, a cable 92 and a connecting terminal 93 as seen in FIGS. 13 and 14.

The repeating unit body 91 is formed in a substantially parallelepiped as seen in FIG. 14. The repeating unit body 91 includes, similarly to the housing 2 of the entertainment apparatus 1 described hereinabove, a control board not shown for controlling the repeating unit 9, an upper case 91A for covering the control board from above (on the opposite side to the Y-axis direction), and a lower case 91B for covering the control board from below (in the Y-axis direction). It is to be noted that, although the upper case 91A and the lower case 91B are formed from a synthetic resin material same as that of the housing 2 of the entertainment apparatus 1, they may otherwise be formed from different materials from each other. Ribs 91A1 similar to the ribs 21B1 described hereinabove are formed on three ones of the four side faces extending downwardly from the upper face of the upper case 91A. More particularly, the ribs 91A1 are formed continuously on those two side faces, from among the four side faces extending substantially downwardly from the substantially rectangular upper face of the upper case 21, which are formed along the longitudinal direction and one of the side faces which is sandwiched between the two side faces. It is to be noted that the side faces of the upper case 91A on which the ribs 91A1 are formed are formed such that they extend outwardly farther than the lower case 91B.

Two card slots 91A3 are formed on each of the two longitudinal side faces of the upper case 91A such that each of them allows attachment of a memory card 8 thereto. In particular, totaling four card slots 91A3 are formed on the repeating unit body 91. The card slots 91A3 are configured substantially similarly to the card slots 21B3 described hereinabove and formed at positions similar to the positions of the card slots 21B3 with respect to the ribs 21B1. A lid portion 91A4 substantially similar to the lid portion 21B4 is provided for each of the card slots 91A3, and where no memory card 8 is mounted in the card slot 91A3, the card slot 91A3 is closed up with the lid portion 91A4.

The controller connecting portions 91B1 similar to the controller connection portions 22B1 are formed in parallel to each other on the lower case 91B. More particularly, on each of the two side faces extending in the longitudinal direction from among the side walls extending uprightly from the bottom face of the lower case 91B, two controller connecting portions 91B1 are formed at positions corresponding to the card slots 91A3 formed on the upper case 91A. Controller connectors 91C are individually exposed in the controller connecting portions 91B1 such that the controllers 7 described hereinabove can be connected individually to the controller connectors 91C.

Card connection portions provided in the inside of the card slots 91A3 and the controller connectors 91C exposed in the controller connecting portions 91B1 are connected to a control board not shown provided in the repeating unit body 91. The control board controls communication of the memory cards 8 connected to the card connection portions mounted in the card slots 91A3 and the controllers 7 connected to the controller connectors 91C with the entertainment apparatus 1.

The cable 92 is provided on the remaining side face of the repeating unit body 91 on which the ribs 91A1 are not formed and extends perpendicularly from the side face. The cable 92 is electrically connected to the control board of the repeating unit body 91, and the connecting terminal 93 to be connected to the entertainment apparatus 1 is provided at an end of the cable 92.

It is to be noted that a cushioning member 91D formed from a rubber material or the like is provided at an end portion of the repeating unit body 91 from which the cable 92 extends such that it covers the outer periphery of the cable 92. The cushioning member 91D is provided to prevent a bend of the cable 92 at an end portion of the repeating unit body 91.

Figure 15:
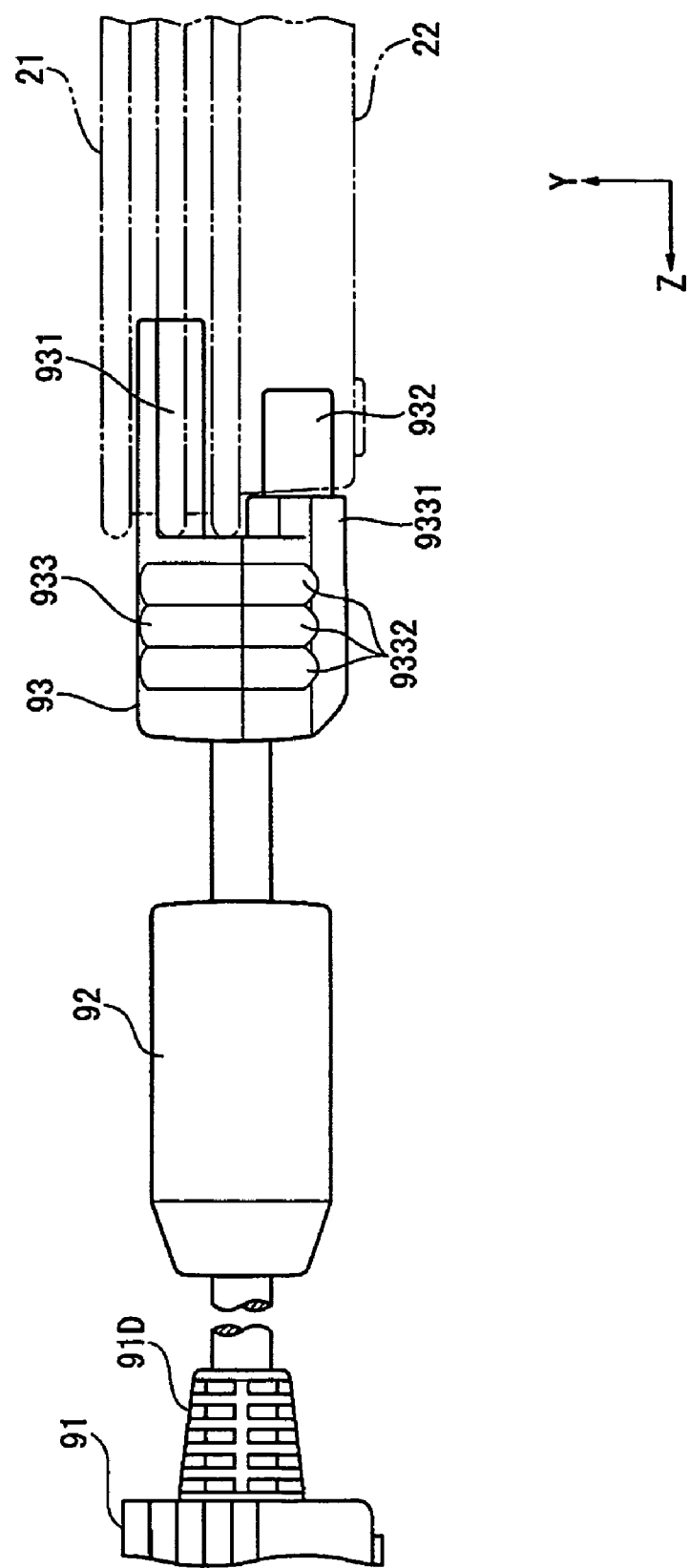
FIG. 15 is a side elevational view showing a connection terminal of the repeating unit shown in FIG. 13.

FIG. 15 shows the connecting terminal 93 in a side elevation. It is to be noted that the Y-axis and Z-axis directions in FIG. 15 are same as the Y-axis and Z-axis directions shown in FIGS. 2 and 3, respectively.

The connecting terminal 93 is formed in a substantially C-shape in side elevation. The connecting terminal 93 includes a memory communication terminal 931 for being inserted into any of the card slots 21B3 of the entertainment apparatus 1, a controller communication terminal 932 for being inserted into one of the controller connection portions 22B1 which is formed directly below the card slot 21B3 in which the memory communication terminal 931 is inserted, and an accommodating case 933 for accommodating and integrating the memory communication terminal 931 and the controller communication terminal 932 with each other therein.

The memory communication terminal 931 is connected to a card connection portion not shown provided in the card slot 21B3. The memory communication terminal 931 is formed such that it extends farther than the controller communication terminal 932. Though not shown, a signal line connector connected to the signal lines in the cable 92 is provided at an end portion of the memory communication terminal 931 on the tip end side in the insertion direction. The signal line connector is electrically connected to the control board of the repeating unit body 91 through the cable 92.

The controller communication terminal 932 is inserted into that one of the controller connection portions 22B1 of the lower case 22 which is provided at a position corresponding to the card slot 21B3 in which the memory communication terminal 931 is inserted, and is connected to the controller connector 41 (refer to FIG. 4) exposed in the controller connection portion 22B1. Though not shown particularly, the controller communication terminal 932 includes a plurality of plug pins which are electrically connected to the control board of the repeating unit body 91 through the signal lines in the cable 92.

The accommodating case 933 is a case made of a synthetic resin material and has a substantially C-shape in cross section. A projection 9331 is provided at an end portion of the accommodating case 933 on the controller communication terminal 932 side. The projection 9331 projects in the extending direction of the controller communication terminal 932 and covers the outer circumference of a base end portion of the controller communication terminal 932. The projection 9331 is configured in such a manner as to compensate for an offset between the front face portion 21B of the upper case 21 which forms the entertainment apparatus 1 and the front face portion 22B of the lower case 22. Consequently, the connecting terminal 93 can be connected stably to the card slot 21B3 and the controller connection portion 22B13 formed on the front face portion 2B of the entertainment apparatus 1.

Further, a positioning projection not shown is formed at a tip end of the projection 9331 while a concave portion not shown is formed at a position of the controller connection portions 22B1, into which the controller communication terminal 932 is inserted, which corresponds to the projection. Consequently, when the connecting terminal 93 is connected to the entertainment apparatus 1, the connection can be performed readily. It is to be noted that the projection and the concave portion may be formed at the mutually opposite members. In particular, the concave portion may be formed on the projection 9331 side while the projection is provided on the controller connection portions 22B1 of the entertainment apparatus 1.

Further, three recesses 9332 are formed on each of the opposite side faces (opposite side faces in the X-axis direction in FIG. 14) of the accommodating case 933 such that they are cut away along the Y-axis direction. The recesses 9332 are provided so as to facilitate grasping of the connecting terminal 93 when the connecting terminal 93 is to be removed from the card slot 21B3 and the controller connection portion 22B1.

By attaching the repeating unit 9 having such a configuration as described above to the entertainment apparatus 1, a greater number of controllers 7 and memory cards 8 can be connected to the entertainment apparatus 1. Consequently, a game can be enjoyed by a greater number of people, and a greater amount of data can be recorded into the memory card 8.

10. Advantages of the Embodiment

According to the present embodiment having the configuration described above, the following advantages are achieved.

10-1. The disk accommodating portion 31 for accommodating the optical disk D has a shape of a combination of a circle and a rectangle. According to the disk accommodating portion 31, the user can hold end portions of the optical disk D at the four corner portions of the disk accommodating portion 31 with its fingers and take out the optical disk D by picking up the portions of the optical disk D. Accordingly, since the region over which the end face of the optical disk D can be held by the fingers can be increased, taking out of the optical disk D is facilitated and the degree of freedom in taking out of the optical disk D can be increased.

Further, since the sides of the rectangular portion of the disk accommodating portion 31 are smaller than the diameter of the optical disk D accommodated in the disk accommodating portion 31, the necessity to form the disk accommodating portion 31 in an unnecessarily large size can be eliminated.

In the disk apparatus, since the space which is formed by the convex portion and surrounds the disk has a rectangular shape having sides smaller in length than the diameter of the disk and having diagonal lines longer than the diameter of the disk as viewed in the direction in which the disk is accommodated, at each of the four corner portions of the rectangular shape, the space into which a finger is to be inserted is formed between the end face of the disk and the corner portion. Accordingly, in order to take out the disk accommodated in the accommodating recess, the user can insert the fingers into the four corner portions of the rectangular shape and hold the end face of the disk with the fingers to take up the disk. Consequently, the region of the accommodating recess in which the end face of the disk can be held by the fingers can be expanded when compared with that of the conventional disk apparatus. Accordingly, the degree of freedom upon taking out of the disk can be enhanced, and a disk taking out operation can be performed readily. Further, since the sides of the rectangular shape are smaller in length than the diameter of the disk, taking out of the disk can be facilitated even if the accommodating recess is not formed in an increased size. Accordingly, the space in the disk apparatus can be utilized effectively, and miniaturization of the disk apparatus can be anticipated.

Particularly since the four corner portions of the disk accommodating portion 31 are formed in a substantially triangular shape whose widthwise dimension gradually increases toward the outer circumferential edge of the disk from the corner portions, the fingers can be inserted readily at the four corner portions of the disk accommodating portion 31, and if the fingers are advanced toward the outer circumferential face of the disk along the bottom face at the corner portions, then the fingers can touch directly with the circumferential edge face of the disk. Accordingly, the disk can be taken out without contact of the fingers with the recording face of the disk.

10-2. The face 32A of the convex portion 32 opposing to the end face of the optical disk D is formed in an inclined relationship such that it is spaced away from the center of the disk accommodating portion 31 toward the perpendicular direction from the bottom face of the disk accommodating portion 31. According to the inclined formation of the face 32A, since the face 32A acts as a guide face for the optical disk D when it is to be accommodated, the optical disk D can be accommodated readily into the disk accommodating portion 31. In addition, when the fingers are inserted into the corner portions of the disk accommodating portion 31 and advanced along the bottom face at the corner portions in order to take out the optical disk D, since the face 32A of the convex portion 32 is formed in an inclined relationship, the fingers can be inserted readily, and also when the fingers are advanced toward the outer circumferential face of the optical disk D, they can be moved smoothly without being obstructed by the convex portion 32 at all.

10-3. Since the threaded hole 2D1 is formed on the side face portion 2D of the housing 2, the stand 5 can be attached to the side face portion 2D. Consequently, it is possible to place the entertainment apparatus 1 in a vertically upright posture. Therefore, it is possible to select one of the horizontally placed posture and the vertically upright posture in accordance with the location of the entertainment apparatus 1. Accordingly, the degree of freedom in arrangement of the entertainment apparatus 1 can be enhanced.

Further, where the entertainment apparatus 1 is in the vertically upright posture, since the vertically upright posture is supported by the stand 5, the entertainment apparatus 1 can be maintained in the vertically upright posture stably by means of the stand 5.

Furthermore, where the entertainment apparatus 1 is placed in the vertically upright posture, since the accommodating recess 3 is closed up with the lid member 21A1 is positioned upwardly, opening/closing operations of the lid member 21A1 and accommodating/taking out operations of the optical disk D can be performed readily.

10-4. Since the partition member 21A3 is provided as a separate member between the flat portion 21A2 and the lid member 21A1 of the upper case 21, the upper faces of the lid member 21A1 and the flat portion 21A2 are not in a continuing relationship. Therefore, an error in manufacture between formation positions of the upper face of the lid member 21A1 which is attached to the upper case 21 and pivoted in the directions indicated by the double-sided arrow mark A and the upper face of the flat portion 21A2 can be made less conspicuous. In particular, if such an error in manufacture as described above appears, then an offset originating from the error is recognized by the user or the like and this makes a factor of spoiling the beauty of the housing. In contrast, since the partition member is provided between the lid member 21A1 and the flat portion 21A2 so that the lid member 21A1 and the flat portion 21A2 are spaced away from each other, such an offset cannot be likely to be recognized by the user or the like. Accordingly, a good appearance of the housing 2 can be maintained.

10-5. The three ribs 21B11, 21B12 and 21B13 are formed on the front face portion 21B and the side face portion 21C of the upper case 21. Among them, the rib 21B13 is formed from the lid member 21A1 attached to the upper case 21, the flat portion 21A2 of the upper case 21, and an extension of the tip end portion of the partition member 21A3 in the Z-axis direction. By the rib 21B13 formed in this manner, a good appearance is provided to the front face portion 21B of the upper case 21, and the size of the upper case 21 in the Y-axis direction can be reduced.

10-6. The rid member opening switch 21B5 and the power supply switch 21B6 are provided on the centrally provided rib 21B12 in such a manner that they are integrated with the rib 21B12. Conventionally, such a switch as just mentioned is in most cases disposed such that it projects perpendicularly from a face on which the switch is provided, and therefore, it is sometimes operated for inputting inadvertently. Also where the switch does not project from the face, since it is exposed at an opening, there is a problem that the appearance is deteriorated by the switch. In contrast, since the rid member opening switch 21B5 and the power supply switch 21B6 are disposed in an integrated state with the rib 21B12, they are less conspicuous, which enhances the beauty of the housing 2, and besides, the switches 21B5 and 21B6 can be prevented from being operated in error for inputting.

10-7. The cylindrical portions 51 and 52 of the stand 5 for supporting the entertainment apparatus 1 in the vertically upright posture are formed such that one end thereof is inclined along the inclination of the side face portion 22D of the lower case 22. With the configuration, the vertically upright posture of the entertainment apparatus 1 can be supported stably. In particular, where a housing of a box-like shape like the lower case 22 is formed by injection molding or the like, since it is difficult to remove the housing from the mold, it is difficult to form a face perpendicularly from an end portion of the bottom face, and a face of the type just mentioned is sometimes formed in an inclined state. Therefore, there is a problem that, if the face formed in an inclined state in this manner is used as the bottom face to allow the entertainment apparatus 1 to be placed in the vertically upright posture, then the vertically upright posture of the entertainment apparatus 1 is not maintained stably. Thus, since the cylindrical portions 51 and 52 of the stand 5 are formed in an inclined relationship in conformity with the side face portion 22D of the lower case 22 formed in an inclined relationship in this manner, the entertainment apparatus 1 in the vertically upright posture can be supported stably.

10-8. In the repeating unit 9 connected to the entertainment apparatus 1, the ribs 91A1 are formed on the upper case 91A similarly to the upper case 21. Consequently, harmony in appearance with the entertainment apparatus 1 can be achieved.

11. Modifications to the Embodiment

The present invention is not limited to the embodiment described above, but any alteration, modification, improvement and so forth within the scope within which the object of the present invention can be achieved are included in the present invention.

11-1. Configuration of the Accommodation Section

Figure 16:
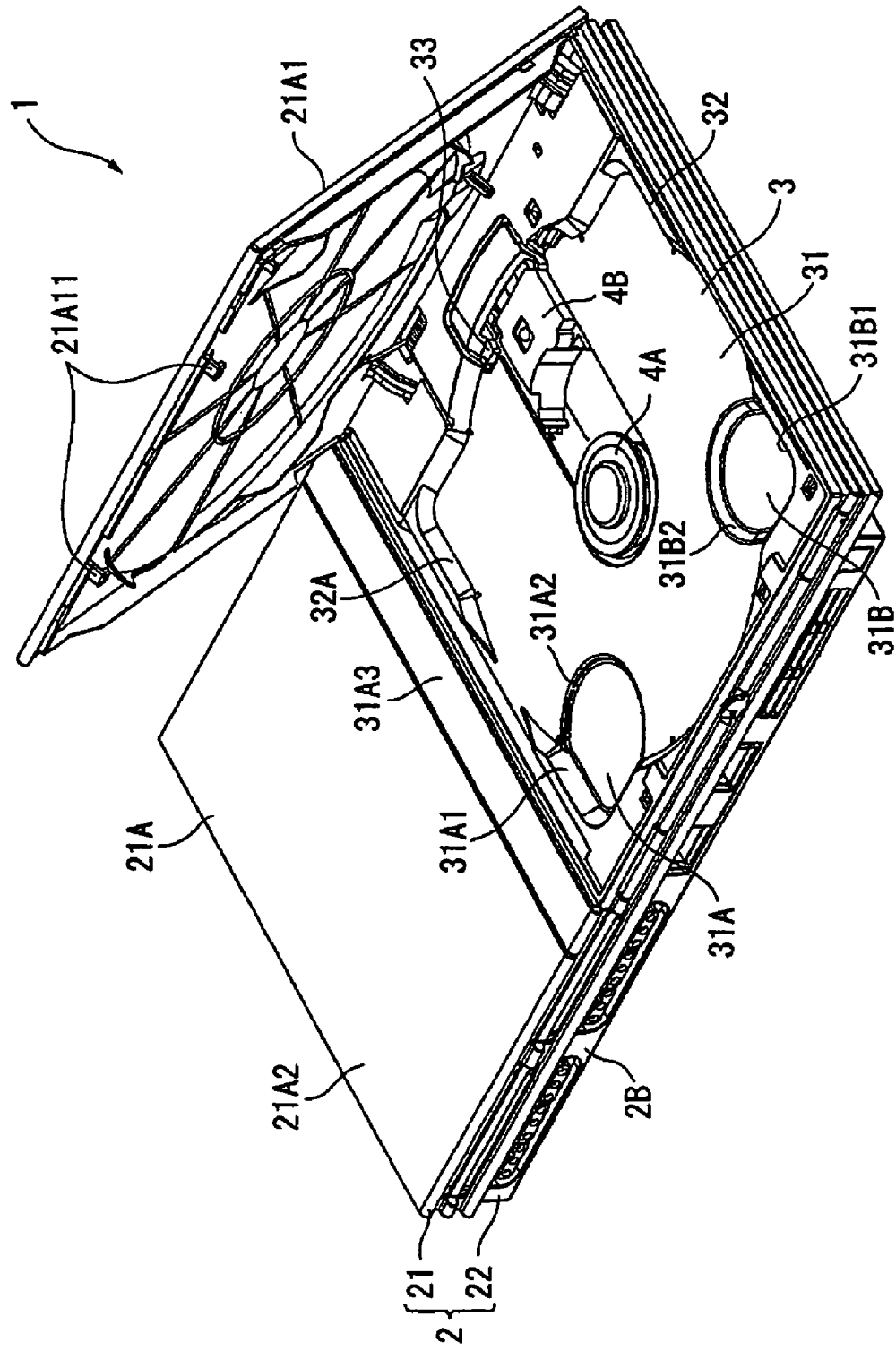
FIG. 16 is a perspective showing a modified accommodation section of the entertainment apparatus of FIG. 1.
Figure 17:
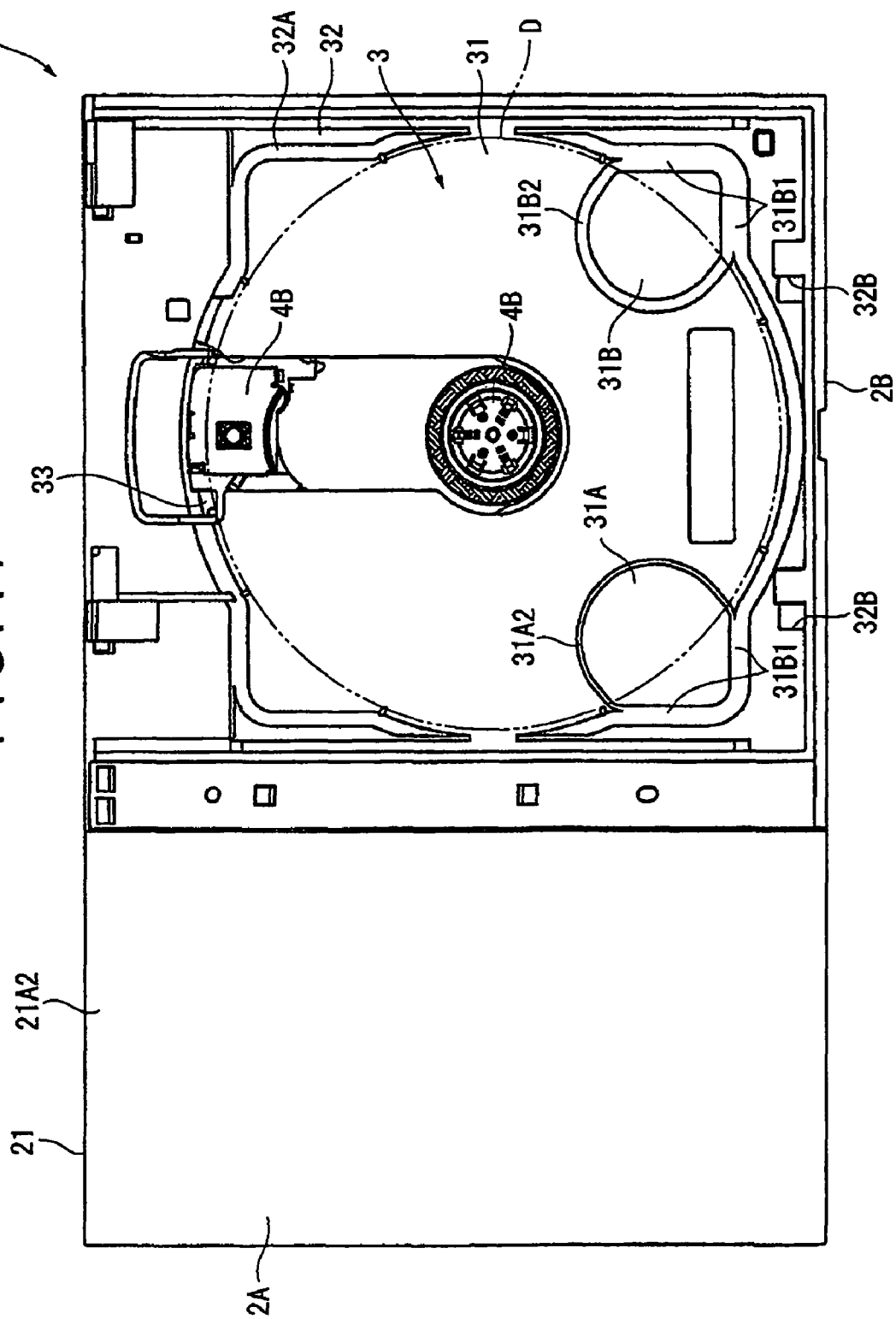
FIG. 17 is a plan view showing the accommodation section shown in FIG. 16.

The configuration of the accommodation section is not limited to that of the embodiment described hereinabove with reference to FIGS. 3 and 12, but may be such as shown in FIGS. 16 and 17. FIG. 16 shows the modified entertainment apparatus 1 with the lid member opened, and FIG. 17 shows the accommodating recess 3 in plan.

The configuration of the accommodation section of the entertainment apparatus 1 shown in FIGS. 16 and 17 is different from the configuration of the accommodation section in the embodiment described hereinabove in the configuration of the accommodating recess 3 and also in that it additionally includes an optical disk inclination regulation section 33 for regulating the optical disk D from being inclined by more than a predetermined amount toward the pickup section 4B.

Referring to FIGS. 16 and 17, the accommodating recess 3 shown includes a disk accommodating portion 31 and a convex portion 32 similarly as in the embodiment described hereinabove. Also the convex portion 32 has a shape of a combination of a rectangle (square) and a circle similarly as in the embodiment described hereinabove. In particular, the lengthwise dimensions of the sides of the rectangle (square) are smaller than the diameter of the optical disk D accommodated in the disk accommodating portion 31, and the length of the diagonal lines is greater than the diameter of the optical disk D. However, the bottom face of at least one of the four corners of the rectangle formed by the convex portion 32 is formed deeper than the bottom face of the disk accommodating portion 31.

Figure 18:
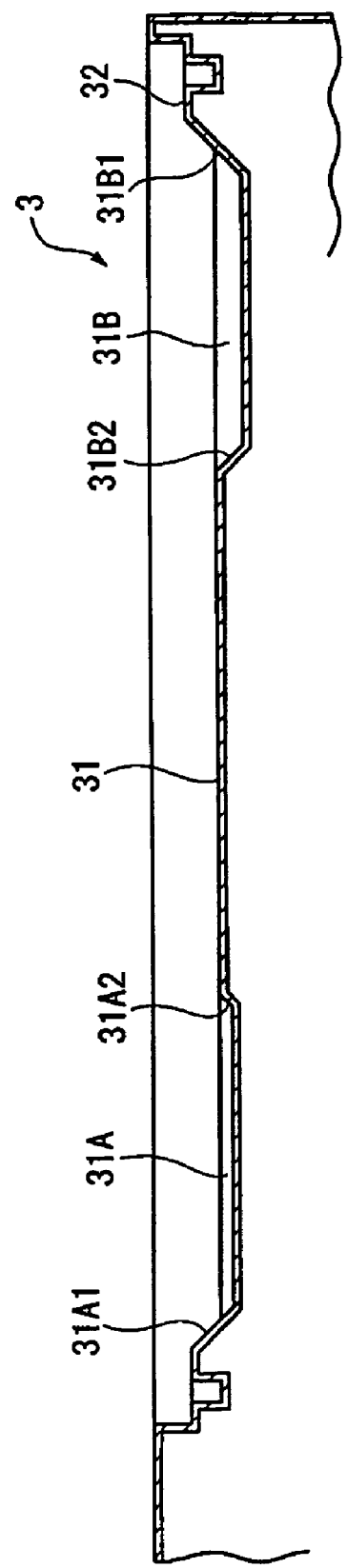
FIG. 18 is a sectional view showing the shape of a bottom portion of the accommodation section shown in FIG. 16.

Here, recessed portions 31A and 31B deeper than the bottom face of the disk accommodating portion 31 are formed on the bottom face of those two corner portions of the rectangle formed by the convex portion 32 which are positioned on the opposite side (front face portion 2B side of the housing 2) to the end portion of the lid member 21A1 along which the lid member 21A1 is supported for pivotal motion. The recessed portions 31A and 31B are formed in such a shape that they have orthogonal two-wall faces 31A1 and 31B1 forming the corner portions of the face 32A of the convex portion 32 and substantially semicircular arcuate wall faces 31A2 and 31B2, and the arcuate wall faces 31A2 and 31B2 extend at least partly into the region of the optical disk D accommodated in the disk accommodating portion 31. Further, although the recessed portions 31A and 31B are formed such that the depth of the recessed portion 31B is greater than that of the recessed portion 31A as seen in FIG. 18, those depths may be same.

According to the configuration described above, since the recessed portions 31A and 31B deeper than the bottom face of the disk accommodating portion 31 are formed on the bottom face at two ones of the four corners of the rectangle formed by the convex portion 32, an offset is formed between the bottom face of the optical disk D accommodated in the disk accommodating portion 31 and the bottom face of each of the recessed portions 31A and 31B. Therefore, when it is tried to take out the disk accommodated in the disk accommodating portion 31, the fingers can be inserted at the four corner portions of the rectangle and distal end portions of the fingers can be further inserted to the bottom face side of the disk from the end face of the disk, and consequently, the disk can be lifted up readily. In other words, a disk taking out operation can be performed further readily.

Particularly since the two recessed portions 31A and 31B are formed on the bottom face at those two ones, of the four corners of the rectangle formed by the convex portion 32, which are positioned on the opposite side to the portion of the lid member 21A1 at which it is supported for pivotal motion, a disk taking out operation can be performed at any of the two corner portions. In other words, where the opposite side of the lid member 21A1 to the side along which the lid member 21A1 is supported for pivotal motion is the front side, a disk taking out operation can be performed from any of the left and right sides. Therefore, the convenience in use is superior.

Further, the two recessed portions 31A and 31B are formed such that they have the orthogonal two-wall faces 31A1 and 31B1 which form the corner portions of the face 32A of the convex portion 32 and the substantially semicircular arcuate wall faces 31A2 and 31B2 and are further formed such that the arcuate wall faces 31A2 and 31B2 extend at least partly into the region of the optical disk accommodated in the disk accommodating portion 31. Therefore, the optical disk D can be taken out readily even if it has a small diameter. In other words, since the recessed portions 31A and 31B are formed with a size with which they extend to a location at approximately ½ the dimension of the recording area radius of the optical disk D with reference to an optical disk having a diameter with which the circumference thereof extends along the arcs of the disk accommodating portion 31, even where the optical disk D has a small diameter, it can be taken out readily. It is to be noted that the recessed portions 31A and 31B may otherwise have a size and/or a shape with which they extend to a location in the proximity of the chucking member 4A.

Further, in the embodiment and the modification described above, the space defined by the convex portion 32, that is, the disk accommodating portion 31, is formed such that, as viewed from the accommodating direction of the optical disk D, the dimension in length of each of the sides of the rectangle (square) is smaller than the diameter of the optical disk D accommodated in the disk accommodating portion 31 but the length of the diagonal lines is greater than the optical disk and the central portion of each of the sides of the square is swollen outwardly circularly in accordance with the shape of the optical disk D. However, the space defined by the convex portion 32 is not limited to this.

For example, the space may otherwise have a shape of a combination of a circle and a rectangle formed such that one side thereof is substantially equal to the diameter of the optical disk D and an adjacent side is smaller than the diameter of the optical disk D. According to the combination just described, the space formed by the convex portion 32 and surrounding the disk is shaped so as to have two corner portions between the convex portion 32 and the outer profile of the optical disk D. In this instance, higher operability is achieved if the two corner portions are provided on the opposite side to the end portion of the lid member 21A1 at which the lid member 21A1 is supported for pivotal motion, that is, at a location of the housing rather near to the front face portion.

Further, the space described above is not limited to a combination of a circular shape and a rectangular shape but may otherwise have a combination of a circular shape and any other polygonal shape including a triangular shape. In particular, the space formed by the convex portion 32 and surrounding the optical disk D may be formed from a combination of part of a circular profile and part of a polygonal profile. In this instance, one corner, preferably at least two corners, of the polygonal shape are provided between the convex portion 32 and the outer profile of the optical disk D. Where the space has a shape having two corner portions, preferably the two corner portions are positioned on the opposite side (a location of the housing rather near to the front face portion) to the side of the lid member 21A1 along which the lid member 21A1 is supported for pivotal motion.

Figure 19:
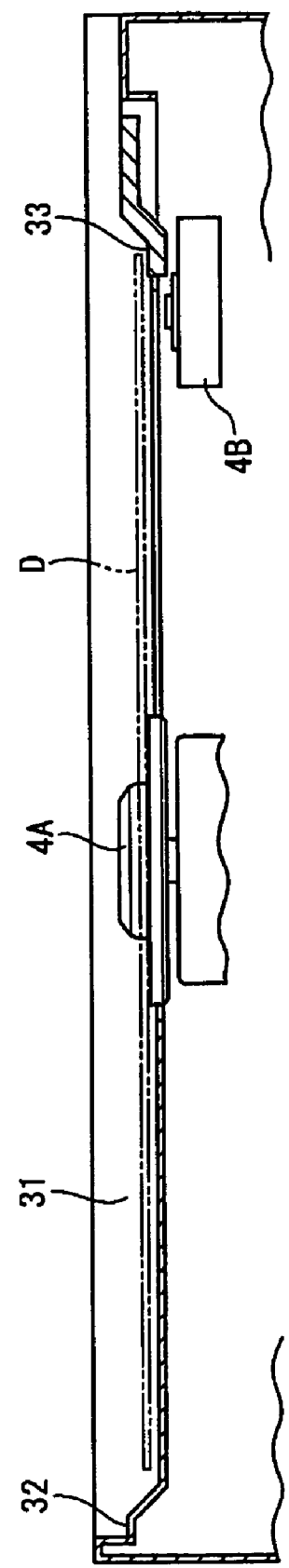
FIG. 19 is a schematic view showing a pickup section and an optical disk inclination regulation section of the accommodation section shown in FIG. 16.

The optical disk inclination regulation section 33 is formed from a member different from the member which forms the convex portion 32, and the pickup section 4B is disposed at an outer side position (position at which the pickup section 4B is opposed to the outer circumferential edge of the optical disk D) of the optical disk D in a radial direction along which the pickup section 4B is moved back and fourth. The upper face of the optical disk inclination regulation section 33, that is, the face for contacting with the optical disk D, is disposed such that it is positioned higher than the bottom face of the disk accommodating portion 31. Further, the dimension from the lower face of the optical disk D to the upper face of the optical disk inclination regulation section 33 is set smaller than the dimension from the lower face of the optical disk D mounted on the chucking member 4A to the pickup section 4B as seen in FIG. 19. In other words, the heightwise position of the optical disk inclination regulation section 33 is set such that the gap from the lower face of the optical disk D to the upper face of the optical disk inclination regulation section 33 is smaller than the gap between the lower face of the optical disk D to the pickup section 4B.

According to the configuration just described, when the optical disk D mounted on the chucking member 4A is rotated at a high speed while the housing 2 is installed in the vertically upright posture, even if the optical disk D is inclined toward the pickup section 4B side, since the optical disk D is brought into contact with the optical disk inclination regulation section 33 before it is brought into contact with the pickup section 4B, otherwise possible damage to the pickup section 4B by such contact of the optical disk D can be prevented. Besides, since only it is necessary to dispose the optical disk inclination regulation section 33 at an outer side position of the optical disk D in a radial direction along which the pickup section 4B is moved back and forth, it is possible to implement a simple and economy constitution.

Further, while, in the embodiment described hereinabove, the face 32A of the convex portion 32 formed on the accommodating recess 3 which is opposed to the end face of the optical disk D is formed in an inclined state, the present invention is not limited to this but the face may otherwise extend vertically uprightly from the bottom face of the disk accommodating portion 31 without being inclined. It is to be noted that, where the face 32A is formed in an inclined state, it serves as a guide face to the disk accommodating portion 31 when the optical disk D is accommodated into the disk accommodating portion 31, and consequently, accommodation of the optical disk D can be performed readily.

11-2. Stand

In the embodiment described hereinabove, the upper faces of the cylindrical portions 51 and 52 formed on the stand 5 are inclined. Alternatively, however, a portion which extends horizontally when the entertainment apparatus 1 is placed in the vertically upright posture may be formed on the lower case 22 in the proximity of the threaded hole 2D1 such that the cylindrical portions of the stand 5 are placed on the portion.

Figure 20:
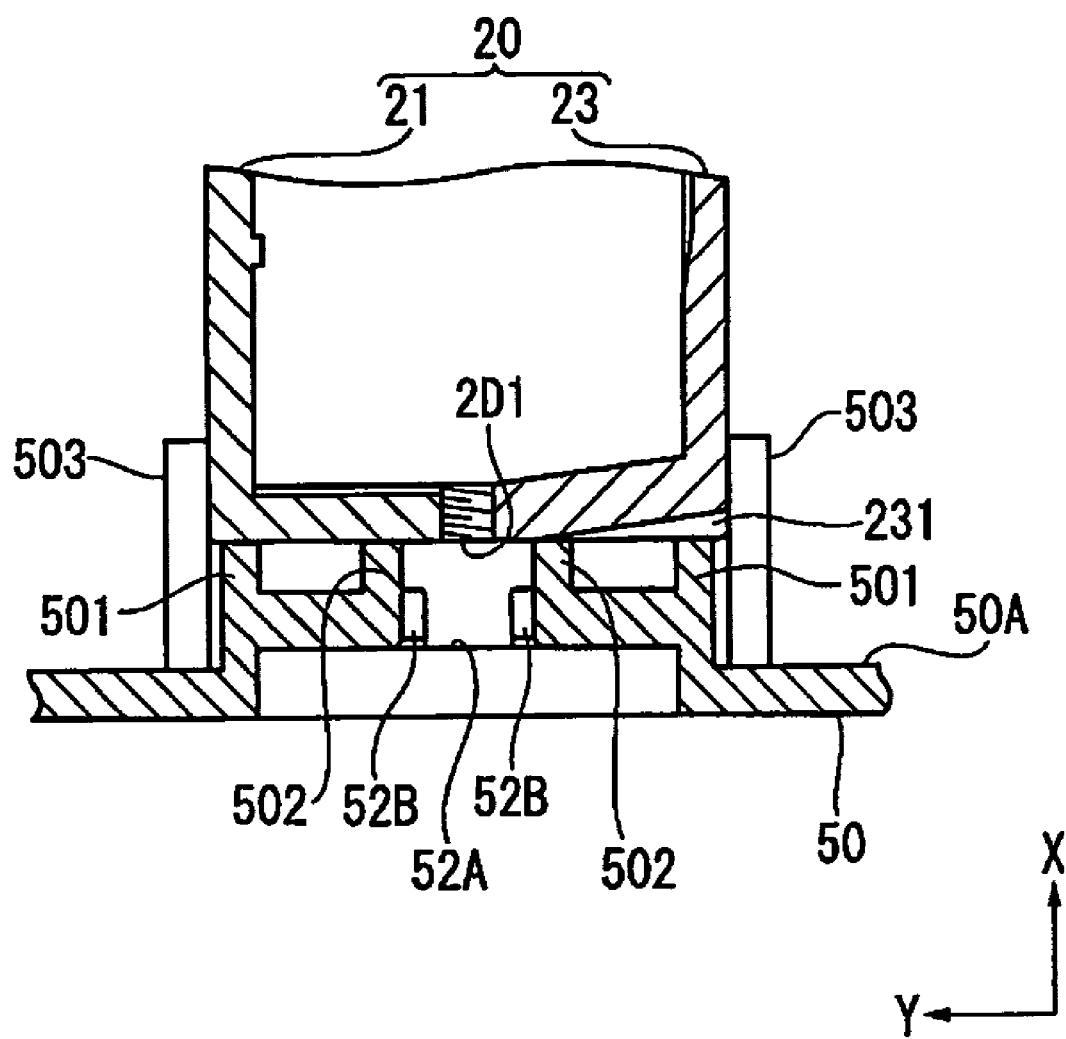
FIG. 20 is a sectional view showing a modified form of the housing and the stand shown in FIG. 9.

FIG. 20 shows in cross section a housing 20 formed from an upper case 21 and a lower case 23 and a stand 50. It is to be noted that the X-axis and Y-axis directions in FIG. 20 are same as the X-axis and Y-axis directions shown in FIGS. 2 and 3, respectively.

The stand 50 has a substantially similar configuration to that of the stand 5 described hereinabove and includes two cylindrical portions 501 and 502 having different diameters from each other and centered at the center of an upper face 50A of the stand 50 and projections 503. While the cylindrical portions 501 and 502 and the projections 503 are configured substantially similarly to the cylindrical portions 51 and 52 and the projections 53, respectively, they are different in that upper faces of the cylindrical portions 501 and 502 are formed horizontally. It is to be noted that a hole 52A and projections 52B are formed on the cylindrical portion 502 similarly to the cylindrical portion 52.

Meanwhile, although the lower case 23 has a substantially similar configuration to that of the lower case 22 described hereinabove, it is different from the lower case 22 in that a horizontal portion 231 which extends horizontally when the housing 20 is placed in a vertically upright posture with the side face portion 2D positioned on the bottom is formed on the lower case 23 in the proximity of the threaded hole 2D1.

The horizontal portion 231 is formed, as viewed in a cross section in the Y-axis direction in FIG. 20, in a substantially right-angled triangle whose hypotenuse is formed from the inclined side face portion 22D and one side of which is formed from a straight line drawn when the side face portion 21D is extended to the opposite side to the Y-axis direction. Though not shown in FIG. 20, such horizontal portions 231 are formed at two locations on the opposite sides of the threaded hole 2D1 in the longitudinal direction of the side face portion 22D. The horizontal portions 231 are formed such that the dimension between end portions of the horizontal portions 231 which are not near to each other substantially coincides with the diametrical dimension of the cylindrical portion 501 of the stand 50. The horizontal portions 231 are abutted at end faces thereof by the upper faces of the cylindrical portions 501 and 502 of the stand 50. Consequently, when the housing 2 is installed on the stand 50, the entertainment apparatus 1 formed including the housing 2 can be supported horizontally. Further, since such horizontal portions 231 are provided, even if the stand 50 is not attached to the entertainment apparatus 1, the entertainment apparatus 1 can be installed in the vertically upright posture with the side face portion 2D used as the bottom.

It is to be noted that, although two such horizontal portions 231 are formed on the opposite sides of the threaded hole 2D1, alternatively only one such horizontal portion 231 may be formed in such a manner as to surround the threaded hole 2D1, or three or more such horizontal portions 231 may be provided.

Further, while, in the embodiment described above, the threaded hole 2D1 serving as a stand attaching portion for attaching the stand 5 or 50 is formed on the side face portion 2D of the housing 2, the present invention is not limited to this. For example, such an alternative configuration may be used that a recess is formed on the side face portion 2D while a projection having a shape complementary to the recess and adapted to be fitted into the recess is formed on the upper face of the stand.

Further, while the portion on which the side face portion 2D of the entertainment apparatus 1 is formed cylindrically as the cylindrical portions 51 and 52 or 501 and 502 on the stand 5 or 50, it may be otherwise formed as a tube or tubes having a substantially rectangular cross section.

Figure 21:
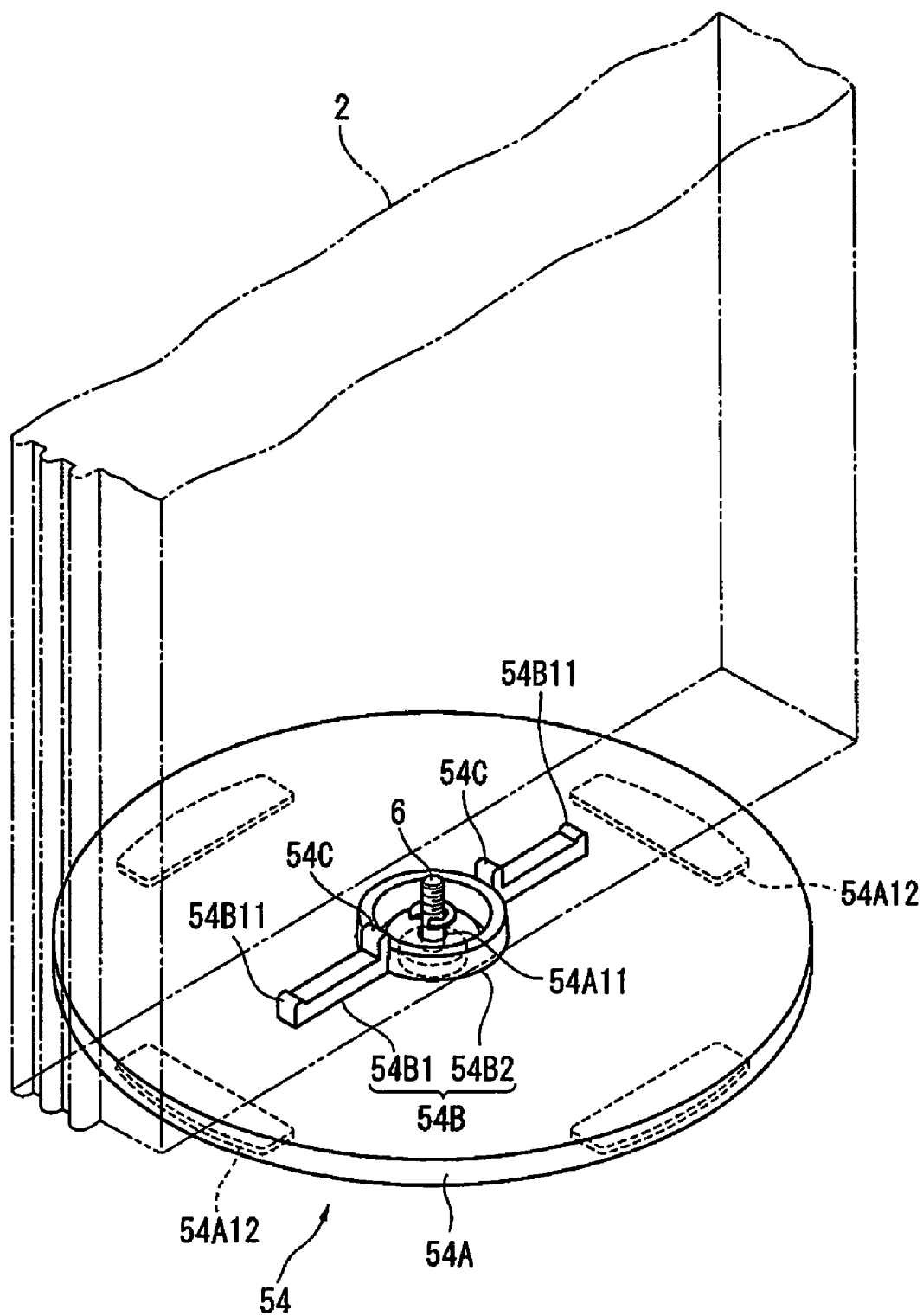
FIG. 21 is a perspective view showing the modified stand shown in FIG. 20.
Figure 22:
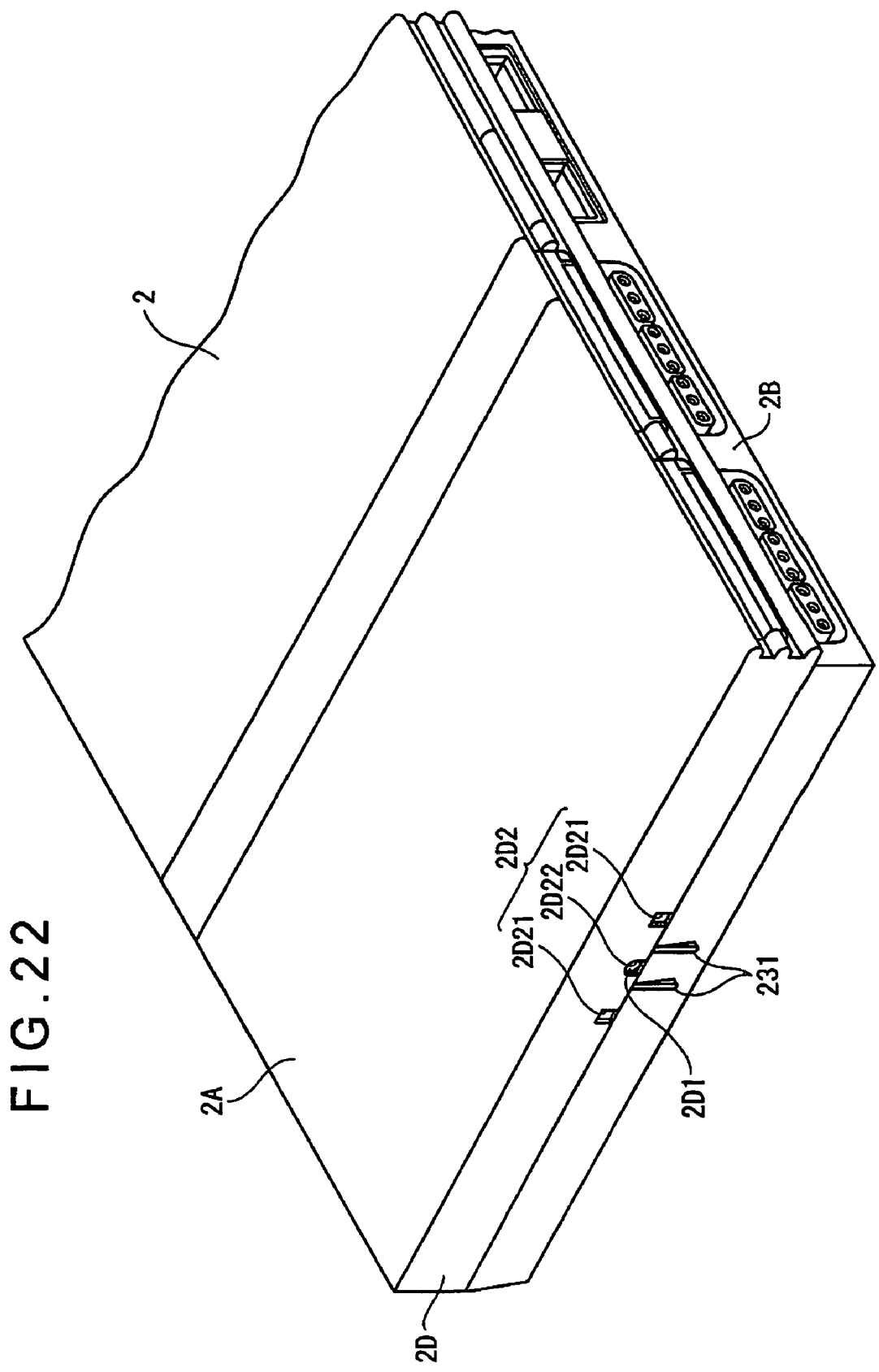
FIG. 22 is a perspective view showing the modified housing showing in FIG. 20 to which the modified stand is attached.

Furthermore, the configuration of the stand is not limited to that of the embodiment described hereinabove with reference to FIGS. 8, 9 and 10 or that of the modification described hereinabove with reference to FIG. 20, but may be that shown in FIGS. 21, 22, 23 and 24. In particular, FIG. 21 shows a stand 54; FIG. 22 shows a stand attaching portion 2D2 provided on the housing 2 for attaching the stand 54; and FIGS. 23 and 24 show different cross sections of the housing 2 and the stand 54 in an assemble state.

Figure 23:
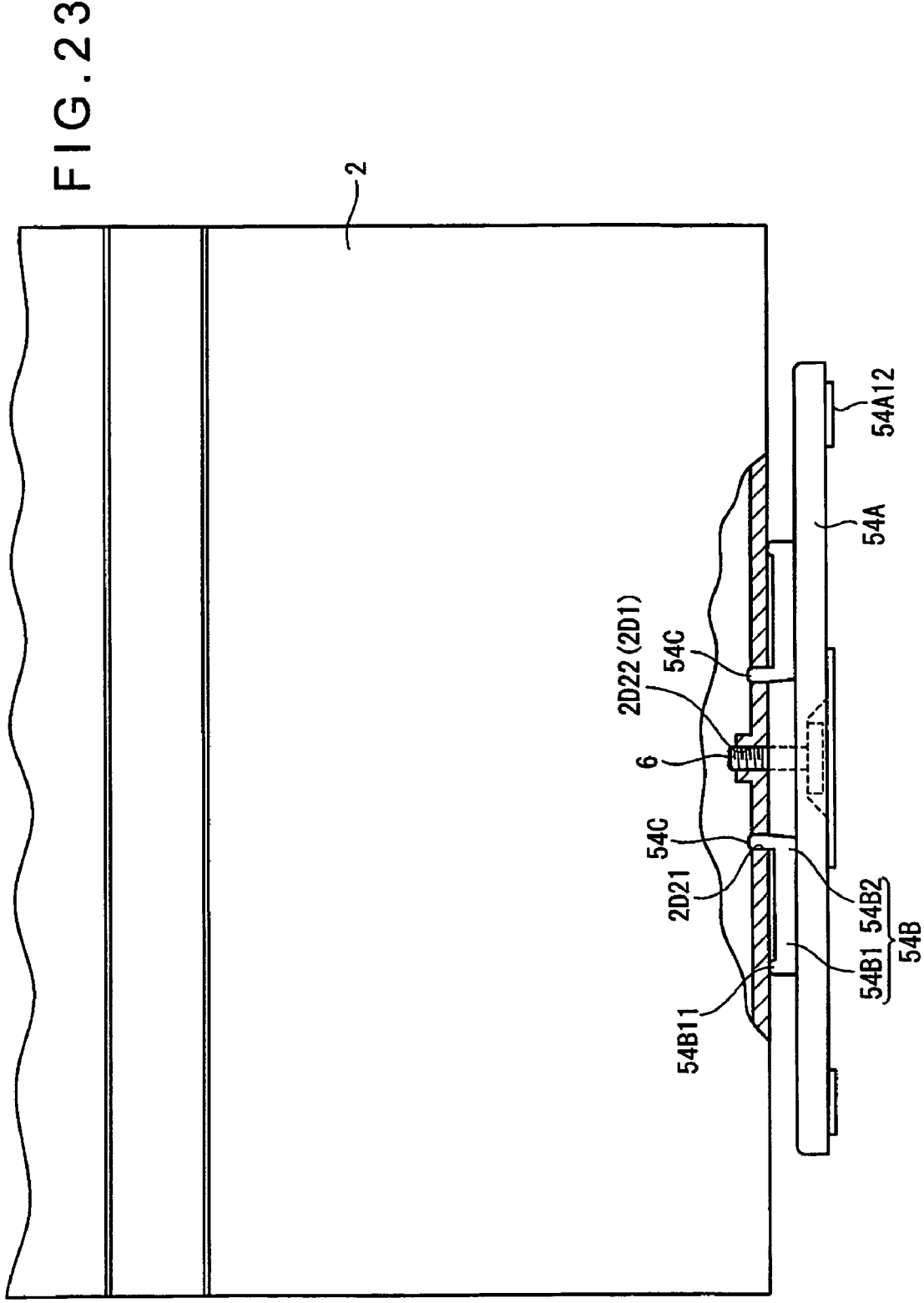
FIG. 23 is a side elevational view, partly in section, showing the modified housing and the modified stand of FIG. 20 in an assembled state.
Figure 24:
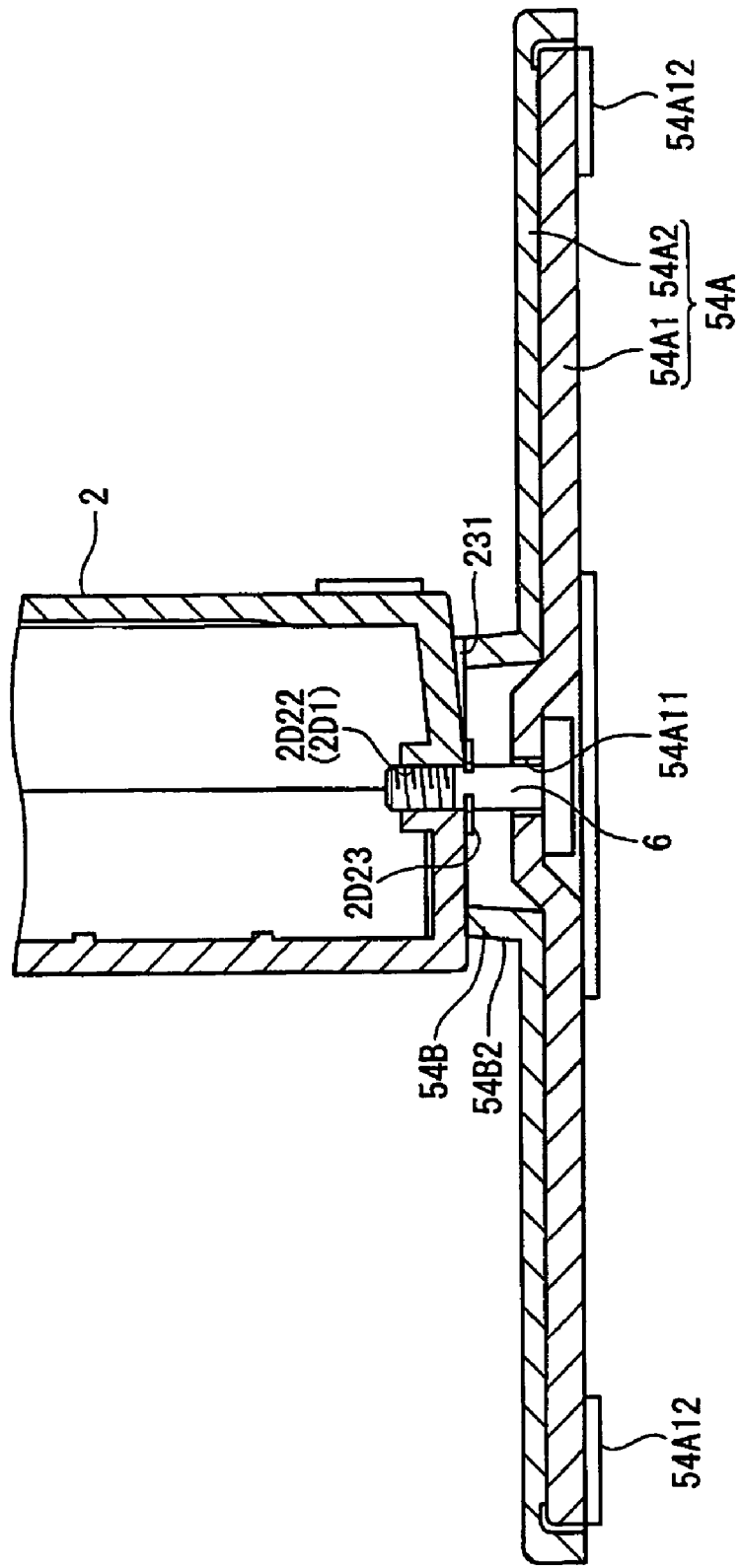
FIG. 24 is a sectional view showing the modified housing and the modified stand of FIG. 20 in an assembled state.

Referring to FIGS. 21, 23 and 24, the stand 54 includes a base plate 54A in the form of a disk, a supporting table portion 54B formed in a linearly projecting manner at a substantially central portion of the base plate 54A and supporting the bottom side of the housing 2, engaging pawl portions 54C provided on the supporting table portion 54B, and a screw 6 serving as a fastening member which extends through the base plate 54A from the bottom face side to integrate the stand 54 and the housing 2 with each other.

The base plate 54A includes a base member 54A1 formed as a disk from a metal material and a surface member 54A2 made of a synthetic resin material for covering an upper face and an outer circumferential face of the base member 54A1. The base member 54A1 has a through hole 54A1 formed at the center thereof such that the screw 6 extends therethrough. Further, non-slip members 54A12 are provided by adhesion at position on an outer circumferential edge portion on the bottom face (installation face) spaced by 90 degrees from each other.

The supporting table portion 54B includes linear supporting portions 54B1 each in the form of a narrow band formed integrally with the surface member 54A2 at a substantially central portion of the base plate 54A and a circular supporting portion 54B2 formed annularly and integrally at central portions of the linear supporting portions 54B1. A pair of supporting protrusions 54B11 are formed at the opposite ends of the linear supporting portions 54B1, and upper ends of the supporting protrusions 54B11 and an upper face of the circular supporting portion 54B2 are formed at an equal height Accordingly, if the housing 2 is placed in the vertically upright posture on the supporting table portion 54B, then the bottom face (side face portion 2D) of the housing 2 is supported by the supporting protrusions 54B11 of the circular supporting portion 54B2 and the linear supporting portions 54B1.

The engaging pawl portions 54C are formed on the opposite sides of the circular supporting portion 54B2 of the supporting table portion 54B such that they project upwardly.

The stand attaching portion 2D2 is formed on the bottom face (side face portion 2D) of the housing 2 as seen in FIG. 22. The stand attaching portion 2D2 includes at least two engaging holes 2D21 and a single fastening member inserting hole 2D22 between the engaging holes 2D21. The two engaging pawl portions 54C of the stand 54 are inserted into the engaging holes 2D21. The fastening member inserting hole 2D22 is formed from a threaded hole 2D1 into which the screw 6 is inserted. It is to be noted that the screw 6 is engaged at a stem portion thereof remote from the head 61 thereof with a stop ring 2D23 so that the screw 6 may not come off the through hole 54A11.

According to the configuration described above, the housing 2 is installed in the vertically upright posture on the supporting table portion 54B of the stand 54. At this time, the two engaging holes 2D21 provided on the housing 2 are inserted into and engaged with the engaging pawl portions 54C of the stand 54. Consequently, the housing 2 is positioned in a state wherein it is blocked against pivotal motion by the engagement between the two engaging holes 2D21 and the engaging pawl portions 54C. Thereafter, the screw 6 is inserted and screwed into the fastening member inserting hole 2D22 of the housing 2 from the bottom face of the base plate 54A to integrate the stand 54 and the housing 2 with each other. As the stand 54 and the housing 2 are integrated with each other, the housing 2 is prevented from falling by the base plate 54A of the stand 54.

11-3. Installation Posture

In the embodiment described hereinabove, the entertainment apparatus 1 can be installed in any of the horizontally placed posture and the vertically upright posture. However, the entertainment apparatus 1 may otherwise be configured so as to assume only one of the postures. Further, while the lid member 21A1 is positioned upwardly when the entertainment apparatus 1 is in the vertically upright posture, it may otherwise be positioned downwardly. It is to be noted that, where the entertainment apparatus 1 can be placed in any of the horizontally placed posture and the vertically upright posture, the installation posture of the entertainment apparatus 1 can be selected in accordance with the installation location, and consequently, the degree of freedom in installation of the entertainment apparatus 1 can be enhanced. Further, where the lid member 21A1 is positioned upwardly when the entertainment apparatus 1 is in the vertically upright posture, an opening/closing operation of the lid member 21A1 and an accommodating/taking out operation of the optical disk D can be performed readily.

11-4. Display Apparatus

In the embodiment described above, a television receiver is electrically connected to the entertainment apparatus 1 such that image information from a result of a process executed in response to an operation of the entertainment apparatus 1 is outputted to the television receiver so as to be displayed on the television receiver. However, it is otherwise possible to configure the entertainment apparatus 1 such that a display apparatus is mounted thereon.

Figure 25:
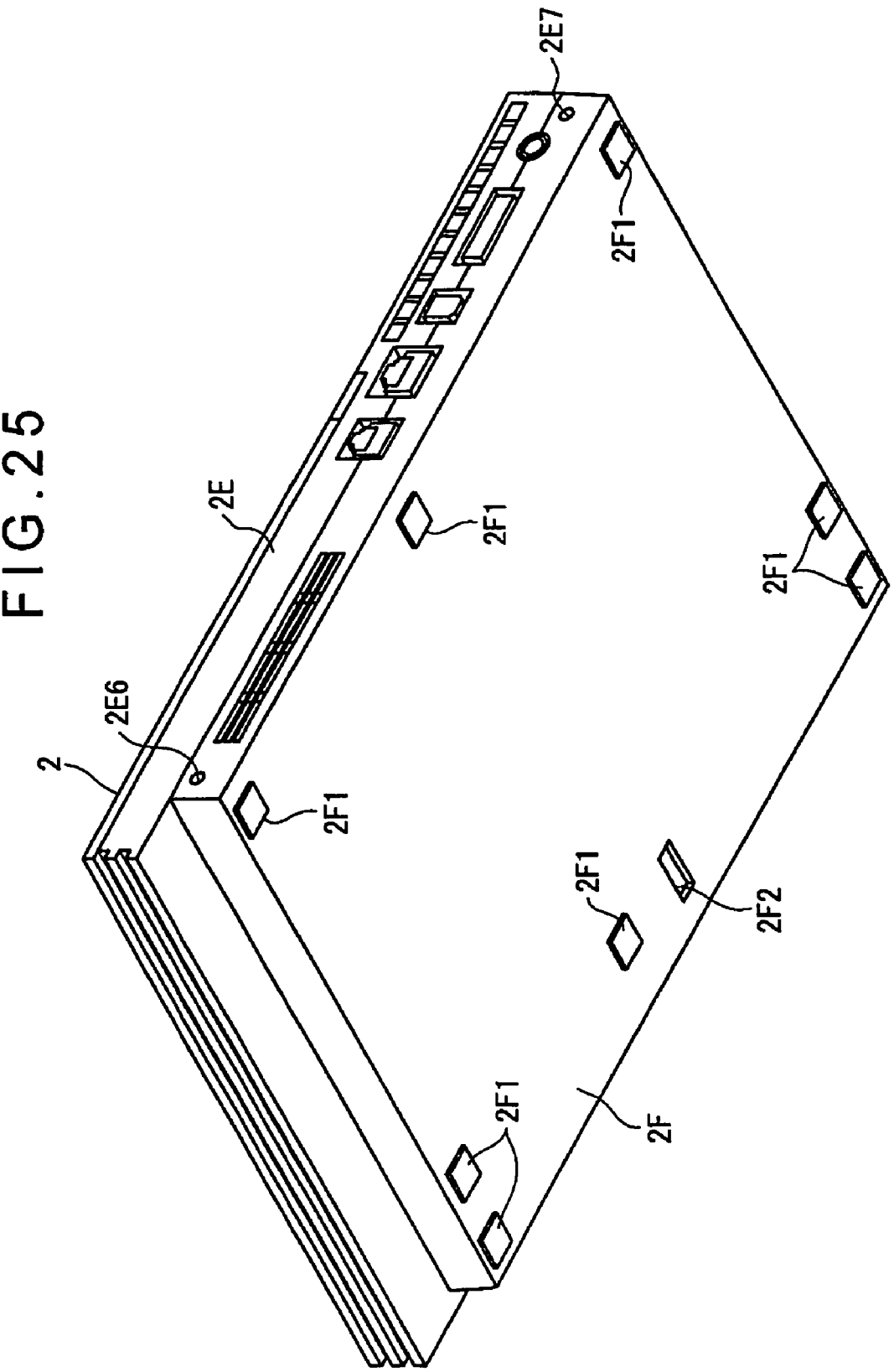
FIG. 25 is a perspective view showing a modification to a bottom face portion of the housing of the entertainment apparatus of FIG. 1.

For example, it is possible, as shown in FIG. 25, to form two threaded holes 2E6 and 2E7 on the opposite sides of the rear face portion 2E of the housing 2 and form a recess 2F2 at a central portion of the bottom face portion 2F rather near to the front face portion such that an attachment for supporting a display apparatus is attached integrally to the housing 2 making use of the two threaded holes 2E6 and 2E7 and the recess 2F2.

An example of the attachment for supporting a display apparatus is shown in FIG. 26. Referring to FIG. 26, the attachment 100 includes a plate 101 in the form of a rectangular plate having a size substantially equal to the bottom face portion 2F of the housing 2, and an engaging lug 102 extending upwardly from a central portion of a front end edge of the plate 101 and bent forwardly so as to have an L-shape for engaging with the recess 2F2 of the housing 2. The attachment 100 further includes an upright piece 103 extending uprightly perpendicularly from a rear end edge of the plate 101, and a pair of bolt fitting holes 104 formed on the opposite portions of the upright piece 103.

In this instance, if the plate 101 is contacted with the bottom face portion of the housing 2 and the engaging lug 102 is inserted into and engaged with the recess 2F2 of the housing 2, whereafter bolts 105 are inserted into the bolt fitting holes 104 of the upright piece 103 and then screwed into the threaded holes 2E6 and 2E7 of the housing 2, then the attachment 100 is attached integrally to the housing 2. If a display apparatus such as, for example, a liquid crystal display apparatus 110 is attached to a central location of the upright piece 103, then image information based on an operation of the entertainment apparatus 1 can be displayed on the liquid crystal display apparatus 110.

11-5. Range of Application

While the entertainment apparatus 1 in the embodiment described above can not only read information from the optical disk D but also record information on the optical disk D depending upon the type of the optical disk D to be used, the entertainment apparatus 1 may otherwise be configured so as to execute at least one of reading and recording of information.

Further, while, in the embodiment described above, an optical disk is adopted as a disk to be used, alternatively a magnetic disk may be used. In other words, any type of disk may be used only if it allows reading of information recorded thereon and/or recording of information.

The present invention can be applied to disk apparatus which reproduce information recorded on and/or record information on an optical disk such as a CD or a DVD, an opto-magnetic disk, a magnetic disk or a disk such as a record.

While a preferred embodiment of the present invention has been described using specific terms, such description is for illustrative purpose only, and it is to be understood that changes and variations may be made without departing from the spirit or scope of the following claims.

12. Advantages of the Embodiment

According to the present embodiment having the configuration described above, the following advantages are achieved.

In the disk apparatus, since the space which is formed by the convex portion and surrounds the disk has a shape of a combination of a circular shape conforming to the shape of an outer profile of the disk and a polygonal shape, or in other words, since the space has a spatial shape having the corner portions of the polygonal shape on the outer side of the circular shape, the fingers can be inserted into the corner portions and hold the disk to take out the disk. Besides, since the portions into which the fingers are inserted are formed from the corner portions, that is, since the portions are formed in a substantially triangular shape whose widthwise dimension gradually increases toward an outer circumferential edge of the disk from the corner portions, the fingers can be inserted readily into the portions. Then, if the fingers are advanced toward the outer circumferential face of the disk along the bottom face of the corner portions, then the fingers can contact directly with the outer circumferential end face of the disk. Accordingly, the disk can be taken out while the recording face of the disk is not touched by the fingers.

Preferably, the space which is formed by the convex portion and surrounds the disk has a rectangular shape having sides smaller in length than the diameter of the disk and having diagonal lines longer than the diameter of the disk as viewed in the direction in which the disk is accommodated, each of the sides being outwardly swollen circularly at a substantially central portion thereof in accordance with the shape of the disk.

In the disk apparatus, since the space which is formed by the convex portion and surrounds the disk has a rectangular shape having sides smaller in length than the diameter of the disk and having diagonal lines longer than the diameter of the disk as viewed in the direction in which the disk is accommodated, at each of the four corner portions of the rectangular shape, the space into which a finger is to be inserted is formed between the end face of the disk and the corner portion. Accordingly, in order to take out the disk accommodated in the accommodating recess, the user can insert the fingers into the four corner portions of the rectangular shape and hold the end face of the disk with the fingers to take up the disk. Consequently, the region of the accommodating recess in which the end face of the disk can be held by the fingers can be expanded when compared with that of the conventional disk apparatus. Accordingly, the degree of freedom upon taking out of the disk can be enhanced, and a disk taking out operation can be performed readily. Further, since the sides of the rectangular shape are smaller in length than the diameter of the disk, taking out of the disk can be facilitated even if the accommodating recess is not formed in an increased size. Accordingly, the space in the disk apparatus can be utilized effectively, and miniaturization of the disk apparatus can be anticipated.

Preferably, a face of the convex portion which is opposed to an end face of the disk accommodated in the accommodating recess is formed in an inclined relationship in such a manner as to be spaced away from the end face of the disk toward the direction in which the convex portion projects.

In the disk apparatus, since the face of the convex portion which is opposed to an end face of the disk accommodated in the accommodating recess is formed in an inclined relationship, the inclined face can serve as a guide face when the disk is accommodated into the accommodating recess. Thus, since the disk can be accommodated into the accommodating recess along the inclined face, an accommodating operation of the disk into the accommodating recess can be performed further readily.

Preferably, at least one of the four corners of the rectangle formed by the convex portion has a bottom face formed deeper than the bottom face of the accommodating recess.

In the disk apparatus, since at least one of the four corners of the rectangle formed by the convex portion has a bottom face formed deeper than the bottom face of the accommodating recess, an offset is formed between the bottom face of the disk accommodated in the accommodating recess and the bottom face of the corner portion. Therefore, when it is tried to take out the disk accommodated in the disk accommodating portion, the fingers can be inserted at the four corner portions of the rectangle and the distal end portions of the fingers can be further inserted to the bottom face side of the disk. Consequently, the disk can be lifted up readily. In other words, a disk taking out operation can be performed further readily.

Preferably, those two ones of the four corners of the rectangle formed by the convex portion which are positioned remotely from an end portion of the housing body at which the lid member is supported for pivotal motion have each a bottom face formed deeper than the bottom face of the accommodating recess.

In the disk apparatus, since each of those two ones of the four corners of the rectangle formed by the convex portion which are positioned remotely from the end portion of the housing body at which the lid member is supported for pivotal motion has a bottom face formed deeper than the bottom face of the accommodating recess, a disk taking out operation can be performed making use of any of the two corner portions. In particular, if the disk apparatus is placed such that the face of the housing remote from the end portion of the housing body at which the lid member is supported for pivotal motion is set as the front, then the disk taking out operation can be performed from any of the left side and the right side. Therefore, the disk apparatus is superior in convenience in use.

Preferably, the housing can be disposed in a horizontally extending posture wherein a face of the housing on the opposite side to the face on which the lid member is provided acts as a bottom and a vertically upright posture wherein the face of the housing on which the lid member is provided acts as a side face and another face of the housing adjacent the face of the housing on which the lid member is provided acts as a bottom.

In the disk apparatus, since it can be disposed in any of the horizontally extending posture and the vertically upright posture, the posture of the disk apparatus can be selected in accordance with the installation location of the disk apparatus. Accordingly, the degree of freedom in arrangement of the disk apparatus can be enhanced.

Preferably, where the housing is placed in the vertically upright posture, the lid member is positioned at an upper portion on the side face of the housing.

In the disk apparatus, since, where the lid member is positioned at an upper portion on the side face of the housing when the disk apparatus is in the vertically upright posture, an opening/closing operation of the lid member can be performed readily in comparison with the case where the lid member is positioned at an lower portion on the side face of the housing. Further, an accommodating operation of the disk into the accommodating recess which is exposed when the lid member is opened and a taking out operation of the disk from the accommodating recess can be performed readily.

Preferably, the bottom face of the housing in the vertically upright posture has a stand attaching portion formed thereon for attaching a stand which is to be mounted on the housing to prevent falling of the housing.

In the disk apparatus, since a stand for preventing falling can be attached through the stand attaching portion, the disk apparatus in the vertically upright state can be disposed stably.

Preferably, the disk apparatus further includes a stand for being mounted on the housing to prevent falling of the housing, the stand attaching portion including at least two engaging holes and a fastening member insertion hole, the stand including a base plate, a supporting table portion provided at a substantially central portion of the base plate for supporting the bottom face of the housing, a pair of engaging pawl portions provided on the supporting table portion for engaging with the two engaging holes, and a fastening member for extending from a bottom face of the base plate through the base plate and being inserted in the fastening member insertion hole to integrate the stand and the housing.

In the disk apparatus, the housing is placed in the vertically upright posture on the supporting table portion of the stand. At this time, the two engaging holes provided on the housing are fitted and engaged with the engaging pawl portions of the stand. Consequently, the housing is positioned on the stand in a state wherein it is prevented from pivotal motion by the engagement between the two engaging holes and the engaging pawl portions. Thereafter, the fastening member is inserted into the fastening member insertion hole of the housing from the bottom face of the base plate to integrate the stand and the housing. As the stand and the housing are integrated with each other in this manner, falling of the housing is prevented by the base plate of the stand.

Preferably, the housing includes a partition member formed as a separate member from the housing body and the lid member for partitioning the housing body and the lid member from each other.

In the disk apparatus, since the partition member provided as a separate member partitions the housing body and the lid member from each other, a difference in thicknesswise dimension between a portion of the housing body at which the lid member is not provided and another portion of the housing body at which the lid member is provided can be made less conspicuous. In particular, depending upon the structure of the lid member as in a case wherein a biasing member is provided for biasing the lid member in its opening direction in order to assist the opening movement of the lid member, the difference in thicknesswise dimension between the portion of the housing body at which the lid member is not provided and the portion of the housing body at which the lid member is provided is sometimes conspicuous where the two portions are juxtaposed in a neighboring relationship. Therefore, in the present invention, the partition member for partitioning the housing body and the lid member from each other is provided as a separate member from the housing on the housing. Consequently, since a distance is provided between the housing body portion on which the lid member is not provided and the hosing body portion on which the lid member is provided, the difference in thicknesswise dimension can be made less conspicuous.

Further, even when external force is applied to the housing body, deformation and so forth of the housing body are suppressed by the partition member, and consequently, the strength of the housing body can be enhanced.

The above and other objects, features and advantages of the present invention will become apparent from the following description and the appended claims, taken in conjunction with the accompanying drawings in which like parts or elements denoted by like reference symbols.

The priority application Number JP2004-272493 and JP2004-140499 upon which this patent application is based are hereby incorporated by reference.

What is claimed is:

1. A disk apparatus, comprising:
an apparatus body including a driving section for rotating a disk of a substantially circular shape on and/or from which information is to be recorded and/or reproduced, an information reading/writing section for reading information recorded on the rotating disk and/or recording information on the disk, and a control section for controlling said driving section and said information reading/writing section; and
a housing for accommodating said apparatus body therein;
said housing including a housing body accommodating the apparatus body and having an accommodating recess formed at a position thereof corresponding to said driving section and said information reading/writing section for accommodating the disk therein and a lid member having a first end pivotally supported on said housing body and a second end to be moved toward the housing body for closing up said accommodating recess;
the housing body having a first placement face and a second placement face adjacent to and intersecting with each other, the housing body being placed in a vertically upright posture or in a horizontally placed posture, the disk apparatus being fully functional when the housing body is placed in the vertically upright posture and in the horizontal placed posture, the vertically upright posture being a posture in which the first placement face serves as a bottom face and the accommodating recess faces upwards, the horizontally placed posture being a posture in which the second placement face serves as the bottom face and the accommodating recess faces sideways;
the driving section including a chucking member disposed within the accommodating recess and engaged with a hole formed at a center of the disk, the chucking member singly holding the disk rotatably;
said accommodating recess having a convex portion formed in a projecting manner on a bottom face thereof such that said convex portion surrounds the mounted disk around a rotary shaft of the chucking member, a face of said convex portion opposed to an end face of the disk accommodated in said accommodating recess is inclined to be spaced away from the end face of the disk toward the direction in which said convex portion projects;
a space which is formed by said convex portion and surrounds the disk having a shape defined as a combination of a circular shape conforming to the shape of an outer profile of the disk and a rectangle of which center is substantially aligned with the center of the circular shape, the length of all the sides of the rectangle being smaller than the diameter of the disk and the length of the diagonal line of the rectangle being greater than the diameter of the disk as viewed in a direction in which the disk is accommodated, wherein two corners of the rectangle formed by the convex portion which are positioned opposite to an end portion of said housing body at which said lid member is pivotally supported are respectively provided with first and second corner portions formed deeper than the bottom face of said accommodating recess,
said first corner portion, which is located upward when the disk apparatus is placed in the vertically upright posture, is formed deeper than said second corner portion, and faces of the corner portions opposite to the end face of the disk are continuous with the face of the convex portion.

2. The disk apparatus according to claim 1, wherein the chucking member includes: a fitted portion fitted into the hole formed at the center of the disk; and a plurality of biasing members provided on the fitted portion and biasing the disk outwardly in a radial direction of the fitted portion when the fitted portion is fitted into the hole.

3. A disk apparatus, comprising:
an apparatus body including a driving section for rotating a disk of a substantially circular shape on and/or from which information is to be recorded and/or reproduced, an information reading/writing section for reading information recorded on the rotating disk and/or recording information on the disk, and a control section for controlling said driving section and said information reading/writing section; and
a housing for accommodating said apparatus body therein;
said housing including a housing body accommodating the apparatus body and having an accommodating recess formed at a position thereof corresponding to said driving section and said information reading/writing section for accommodating the disk therein and a lid member having a first end pivotally supported on said housing body and a second end to be moved toward the housing body for closing up said accommodating recess;
the driving section including a chucking member disposed within the accommodating recess and engaged with a hole formed at a center of the disk, the chucking member singly holding the disk rotatably;
said accommodating recess having a convex portion formed in a projecting manner on a bottom face thereof such that said convex portion surrounds the mounted disk around a rotary shaft of the chucking member, a face of said convex portion opposed to an end face of the disk accommodated in said accommodating recess is inclined to be spaced away from the end face of the disk toward the direction in which said convex portion projects;
a space which is formed by said convex portion and surrounds the disk having a shape defined as a combination of a circular shape conforming to the shape of an outer profile of the disk and a rectangle of which center is substantially aligned with the center of the circular shape, the length of all the sides of the rectangle being smaller than the diameter of the disk and the length of the diagonal line of the rectangle being greater than the diameter of the disk as viewed in a direction in which the disk is accommodated, wherein two corners of the rectangle formed by the convex portion which are positioned opposite to an end portion of said housing body at which said lid member is pivotally supported are respectively provided with first and second corner portions formed deeper than the bottom face of said accommodating recess, said first corner portion is formed deeper than said second corner portion, and faces of the corner portions opposite to the end face of the disk are continuous with the face of the convex portion.

* * * * *